(12) United States Patent
Miyakawa et al.

(10) Patent No.: US 9,194,979 B2
(45) Date of Patent: Nov. 24, 2015

(54) SEPARATED LIQUID COLORATION COMPOSITION AND COLORED LIQUID USING SAME

(71) Applicants: Atsushi Miyakawa, Kita-adachi-gun (JP); Maiko Kitade, Kita-adachi-gun (JP)

(72) Inventors: Atsushi Miyakawa, Kita-adachi-gun (JP); Maiko Kitade, Kita-adachi-gun (JP)

(73) Assignee: DIC CORPORATION, Tokyo (JP)

( * ) Notice: Subject to any disclaimer, the term of this patent is extended or adjusted under 35 U.S.C. 154(b) by 0 days.

(21) Appl. No.: 14/122,432

(22) PCT Filed: Nov. 28, 2012

(86) PCT No.: PCT/JP2012/080734
§ 371 (c)(1),
(2) Date: Nov. 26, 2013

(87) PCT Pub. No.: WO2013/081001
PCT Pub. Date: Jun. 6, 2013

(65) Prior Publication Data
US 2014/0332736 A1 Nov. 13, 2014

(30) Foreign Application Priority Data

Dec. 2, 2011 (JP) .................................. 2011-264565
Jan. 6, 2012 (JP) .................................. 2012-001138
Apr. 23, 2012 (JP) .................................. 2012-097670

(51) Int. Cl.
| | |
|---|---|
| C09K 9/00 | (2006.01) |
| G02F 1/00 | (2006.01) |
| G02B 26/00 | (2006.01) |
| G02B 1/00 | (2006.01) |
| C08F 220/24 | (2006.01) |
| G09F 9/37 | (2006.01) |
| G09F 13/24 | (2006.01) |
| C08F 222/10 | (2006.01) |

(52) U.S. Cl.
CPC .............. *G02B 1/002* (2013.01); *C08F 220/24* (2013.01); *G02B 26/005* (2013.01); *G09F 9/372* (2013.01); *G09F 13/24* (2013.01); *C08F 2222/108* (2013.01)

(58) Field of Classification Search
USPC ................... 252/583; 359/296, 245; 428/327; 523/201; 524/588; 345/107
See application file for complete search history.

(56) References Cited

U.S. PATENT DOCUMENTS

| | | | |
|---|---|---|---|
| 2003/0040568 A1* | 2/2003 | Furuta et al. ................... | 524/520 |
| 2009/0061209 A1 | 3/2009 | Yamamoto et al. | |
| 2009/0201569 A1* | 8/2009 | Akashi et al. .................. | 359/296 |
| 2009/0318580 A1* | 12/2009 | Nakano et al. ................. | 522/148 |

FOREIGN PATENT DOCUMENTS

| | | | | |
|---|---|---|---|---|
| JP | 03-266818 | A | 11/1991 | |
| JP | 10-039800 | A | 2/1998 | |
| JP | 10-074055 | A | 3/1998 | |
| JP | 2002-107772 | A | 4/2002 | |
| JP | 2008-203282 | A | 9/2008 | |
| JP | 2009-062420 | A | 3/2009 | |
| JP | 2010-244069 | A | 10/2010 | |
| JP | 2011-007927 | A | 1/2011 | |
| JP | 2011-510336 | A | 3/2011 | |
| JP | 2011-170044 | A | 9/2011 | |
| JP | 2012-068507 | A | 4/2012 | |
| WO | 2011/017446 | A1 | 2/2011 | |
| WO | WO 2011/017446 | A1 * | 2/2011 | ............. G02B 26/00 |

OTHER PUBLICATIONS

International Search Report of PCT/JP2012/080734, mailing date of Jan. 29, 2013.

* cited by examiner

*Primary Examiner* — Bijan Ahvazi
(74) *Attorney, Agent, or Firm* — Westerman, Hattori, Daniels & Adrian, LLP

(57) ABSTRACT

A separated colored liquid composition used in a device involving an optical modulation technique in which a liquid is moved or subjected to a change in shape by an external electric field to change color or brightness, the separated colored liquid composition containing a colored liquid, a non-colored liquid immiscible with the colored liquid, and at least one additive selected from a fluorine-based surfactant and a silicone-based surfactant. Use of such a composition as a composition for forming an image in a device involving an optical modulation technique in which a liquid is moved or subjected to a change in shape by an external electric field to change color or brightness.

8 Claims, No Drawings

SEPARATED LIQUID COLORATION COMPOSITION AND COLORED LIQUID USING SAME

TECHNICAL FIELD

The present invention relates to a separated colored liquid composition used in a modulation technique in which an external electric field is utilized to move a liquid, and in particular, used in electrowetting devices.

BACKGROUND ART

Modulation techniques in which an external electric field is utilized to move a liquid have been studied in the field of optical devices such as image display devices, optical shutters, optical pickup devices, and liquid optical lenses. Representative examples of such modulation techniques include an electroosmosis technique, an electrophoretic technique, an electrofluidic technique, and an electrowetting technique.

Among these, an electrowetting technique enables a high contrast ratio and a wide viewing angle and precludes use of a front light and back light; hence, use of the electrowetting technique in image display devices which operate with low power consumption has been studied. The principle thereof is based on the phenomenon called as "electrocapillary" as disclosed in Patent Literatures 1 and 2; in particular two separated liquids, namely, two immiscible liquids, which have different color tones and degrees of transparency are used, and the size of a droplet of one liquid put in the other liquid is changed on the basis of application or non-application of voltage, thereby forming colored images. It is possible, for example, to change the size of a droplet of a colored liquid, such as black liquid, put in a colorless liquid to form a color image, such as a black image, on a transparent background; to change the size of a droplet of a colorless liquid put in a colored liquid to form a transparent image on a colored background; and to change the size of a blue droplet put in a red liquid to form a purple image on a red background.

Since such two separated liquids, namely, two immiscible liquids, which have different color tones and degrees of transparency (hereinafter referred to as "separated colored liquid composition") need to be in a separated state, in other words, an immiscible state, nonpolar solvents such as silicone oil and polar solvents such as water, alcohol, and ethylene glycol are generally used, and a colorant is added to at least any one of these solvents (a liquid to which a colorant has been added is hereinafter referred to as "colored liquid", and the other liquid is hereinafter referred to as "liquid immiscible with the colored liquid).

In an example in which a colorant is added to a polar solvent, Patent Literature 3 discloses a technique involving use of a colored liquid in which an ionic liquid containing an ambient temperature molten salt produced by a combination of a cation and an anion and a self-dispersible pigment having a functional group, such as a carboxyl group, a hydroxyl group, a carbonyl group, a sulfone group, a hydroxyl group, and a phosphate group, have been added to a polar solvent. Furthermore, Patent Literature 4 discloses a technique involving use of a colored liquid in which a pigment or a dye has been added to a polar solvent having a specific viscosity and surface tension and which has a specific electric conductivity and ionic radius.

In an example in which a colorant is added to a nonpolar solvent, Patent Literature 5 discloses a technique involving use of a colored liquid in which an organic pigment and/or an inorganic pigment, a solvent-soluble or solvent-dispersible polymer dispersant, and an aldehyde resin or a ketone resin have been added to a nonpolar solvent such as decane, decalin, or tetralin.

In image display devices in which such a separated colored liquid composition is used, liquids having different polarities contact each other at the interface therebetween. Hence, in the case where a colorant contained in the colored liquid intrudes into the liquid immiscible with the colored liquid across the interface, the switching performance in optical modulation brought about by a change in the size of a droplet of the colored liquid by application of voltage is reduced or lost. Thus, the demand characteristic of the separated colored liquid composition for long-term stable operation of a display device is a reduction of such intrusion of a colorant across the interface. In a state in which such an image display device is operated, the two liquids may be temporarily mixed at the interface therebetween due to an effect of, for example, repeated application/non-application of voltage or unexpected shock. In the case where the state in which the two liquids have been mixed continues with the result that the interface becomes unclear and in the case where aggregates are generated at the interface, the switching performance in optical modulation brought about by a change in the size of a droplet of the colored liquid by application of voltage may be reduced or lost. Accordingly, the separated colored liquid composition also needs to have a property in which the colored liquid and the liquid immiscible with the colored liquid promptly return to the initial state of separation.

A method involving use of a surfactant may be employed to control the behavior of the colored liquid and liquid immiscible with the colored liquid at the interface therebetween in the separated colored liquid composition; however, it is known that use of typical surfactants causes problems in which a hydrophobic liquid does not have an intended dispersibility and in which the hydrophobic intermediate layer of an electrowetting device is polluted (e.g., see Patent Literature 6). From this point of view, Patent Literature 6 discloses addition of a nonionic surfactant produced through an optical ene-tiol reaction; in particular, the nonionic surfactant is composed of a highly hydrophobic compound and a nonionic and highly hydrophilic compound so as to be in the form of an emulsion ink in the production thereof and so as to be in the form of a layer in which the hydrophilic liquid has been separated from the hydrophobic liquid after the production, and the difference in the value of SP between the compound having a hydrophobic segment and the compound having a hydrophilic segment is not less than four (e.g., see Patent Literature 6).

CITATION LIST

Patent Literature

PTL 1: Japanese Unexamined Patent Application Publication No. 10-39800
PTL 2: Japanese Unexamined Patent Application Publication No. 10-74055
PTL 3: Japanese Unexamined Patent Application Publication No. 2008-203282
PTL 4: International Publication No. WO 2011/017446
PTL 5: Japanese Unexamined Patent Application Publication (Translation of PCT Application) No. 2011-510336
PTL 6: Japanese Unexamined Patent Application Publication No. 2012-68507

SUMMARY OF INVENTION

Technical Problem

It is an object of the present invention to prevent a colorant contained in a colored liquid from intruding into a liquid immiscible with the colored liquid across the interface therebetween and/or to provide a separated colored liquid composition in which a colored liquid and a liquid immiscible with the colored liquid can be promptly separated even after mixing thereof without generation of the unclear interface therebetween and generation of aggregates at the interface to stably maintain optical modulation by a droplet of the colored liquid put in the liquid immiscible with the colored liquid.

Solution to Problem

The inventors have found that the above-mentioned object can be accomplished by adding at least one additive selected from a fluorine-based surfactant and a silicone-based surfactant to a separated colored liquid composition.

In particular, an aspect of the present invention provides a separated colored liquid composition used in a device involving an optical modulation technique in which a liquid is moved or subjected to a change in shape by an external electric field to change color or brightness, the separated colored liquid composition containing a colored liquid (A), a liquid (B) immiscible with the colored liquid, and at least one additive (C) selected from a fluorine-based surfactant and a silicone-based surfactant.

Another aspect of the present invention provides a colored liquid used for the above-mentioned separated colored liquid composition, the colored liquid containing a colorant and at least one additive (C) selected from a fluorine-based surfactant and a silicone-based surfactant.

Another aspect of the present invention provides a liquid which is immiscible with the above-mentioned colored liquid used for the separated colored liquid composition, the liquid containing at least one additive (C) selected from a fluorine-based surfactant and a silicone-based surfactant.

Another aspect of the present invention provides use of the above-mentioned separated colored liquid composition as a composition for forming an image in a device involving an optical modulation technique in which a liquid is moved or subjected to a change in shape by an external electric field to change color or brightness.

Advantageous Effects of Invention

According to aspects of the present invention, a separated colored liquid composition can be provided, which enables a colorant contained in a colored liquid to be prevented from intruding into a liquid immiscible with the colored liquid across the interface therebetween and in which the colored liquid and the liquid immiscible with the colored liquid can be promptly separated even after mixing thereof without generation of an unclear interface and generation of aggregates at the interface. Such a separated colored liquid composition can be usefully employed as a composition for forming an image in a device involving an optical modulation technique in which a liquid is moved or subjected to a change in shape by an external electric field to change color or brightness.

DESCRIPTION OF EMBODIMENTS

Definition of Term

In the present invention, the term "being immiscible" refers to the following state: at the interface at which two liquids contact each other, a visible mixed layer is not formed, and the interface has smoothness. In the present invention, the term "separated colored liquid composition" refers to a composition containing two separated liquids, namely, two immiscible liquids, which have different color tones and degrees of transparency. In the present invention, one of the above-mentioned two liquids which contains a colorant as an essential component is referred to as "colored liquid (A)", and a liquid which may optionally contain a colorant and which is separated from the colored liquid (A), in other words, immiscible therewith is referred to as "liquid (B) immiscible with the colored liquid (A)" (alternatively, also simply referred to as "liquid (B)").

In the case where the colored liquid (A) and the liquid (B) are used in devices involving an optical modulation technique such as electrowetting, the colored liquid (A) serves as a liquid used for forming a display pattern, and the liquid (B) serves as a liquid used for forming the background of the display pattern.

(Separated Colored Liquid Composition)

The separated colored liquid composition of the present invention contains a colored liquid (A), a liquid (B) immiscible with the colored liquid (A), and at least one additive (C) selected from a fluorine-based surfactant and a silicone-based surfactant.

(Colored Liquid)

The colored liquid (A) used in the present invention contains a solvent and a colorant. Solvents are classified into a polar solvent and a nonpolar solvent on the basis of the relative permittivity thereof; in the present invention, a solvent having a relative permittivity of not less than 20 is referred to as a polar solvent, and a solvent having a relative permittivity less than 20 is referred to as a nonpolar solvent. In the present invention, either of the polar solvent and the nonpolar solvent can be used as the solvent of the colored liquid.

(Polar Solvent)

The polar solvent used in the present invention may be any polar solvent typically used in electrowetting devices, and known polar solvents can be employed. Specific examples thereof include water, methanol, ethanol, 1-propanol, 1,2-propanediol, 1,3-propanediol, ethylene glycol, triethylene glycol, glycerine, diethylene glycol, dipropylene glycol, ethylene carbonate, propylene carbonate, 1,2-butylene carbonate, glycerine carbonate, dimethyl carbonate, diethyl carbonate, acetone, formamide, N-methylformamide, dimethylformamide, N-methylacetamide, dimethylacetamide, dimethylsulfoxide, sulfolane, β-propiolactone, β-valerolactone, γ-butyrolactone, γ-valerolactone, δ-valerolactone, and mixtures thereof at any mixing ratio.

Among these, water, methanol, ethanol, isopropanol, 1,2-propanediol, ethylene glycol, mixtures thereof, and substances containing these materials as main ingredients are preferred.

In order to enhance relative permittivity, an electrolyte such as a salt that is dissociated to yield ions in a polar solvent can be added. The ions may be cations or anions.

Specific examples of usable salts include salts containing cations, such as pyrazoline, 2-imidazoline, pyrazole, imidazoline-2-thione, 1,2,3-thiazole, 1,2,4-thiazole, 1H-tetrazole, oxazoline, 5-oxazolone, isoxazole, oxazole, 2-thiazoline, isothiazole, thiazole, 1,2,3-oxadiazo, i.e., 1,2,4-oxadiazo, i.e., 1,2,5-oxadiazo, i.e., 1,3,4-oxadiazole, 1,3,4-thiadiazole, LH-pyridine-2-one, piperazine, pyridizine, 1,2,3-triazine, 1,2,4-triazine, oxazine, thiomorpholine, oxadiazine, oxathiazine, indoline, indole, carbazole, indazole, benzimidazole, quinoxaline, phthalazine, 1,5-naphthyridine, phenazine, benzothiazole, 2H-1 1,4-benzoxazine, phenoxazine, and phenothiazine.

The amount thereof can be appropriately determined on the basis of intended relative permittivity. Such a salt can be, for instance, used within 10 weight %.

(Nonpolar Solvent)

The nonpolar solvent used in the present invention may be any nonpolar solvent typically used in electrowetting devices, and known nonpolar solvents can be employed. Specific examples thereof include non-aqueous linear and/or branched alkanes or cycloalkanes having 4 to 30 carbon atoms, preferably pentane, hexane, heptane, octane, nonane, decane, undecane, dodecane, tridecane, tetradecane, cyclopentane, cyclohexane, cycloheptane, cyclooctane, and methylcyclohexane, and especially preferably, decane, undecane, dodecane, tridecane, tetradecane, and mixtures thereof at any mixing ratio; linear and/or branched and/or cyclic haloalkanes having 1 to 30 carbon atoms, preferably dichloromethane, chloroform, tetrachloromethane, dichloroethane, trichloroethane, tetrachloroethane, chlorocyclohexane, and regioisomers thereof; aromatic compounds having 6 to 22 carbon atoms, preferably benzene, toluene, xylene, mesitylene, and mixtures thereof at any mixing ratio; hydrogenated aromatic compounds having 10 to 22 carbon atoms, preferably tetralin, cis- and trans-decalin, and mixtures thereof at any mixing ratio, and especially preferably cis- and trans-decalin;

halogenated aromatic compounds having 6 to 22 carbon atoms, preferably chlorobenzene, fluorobenzene, dichlorobenzene, difluorobenzene, trichlorobenzene, trifluorobenzene, chloronaphthalene, fluoronaphthalene, and regioisomers thereof; linear and/or branched and/or cyclic alcohol having 4 to 22 carbon atoms, preferably butanol, pentanol, hexanol, heptanol, octanol, nonanol, decanol, undecanol, dodecanol, benzyl alcohol, phenylethanol, cyclopentanol, cyclohexanol, cycloheptanol, cyclooctanol, and regioisomers thereof; linear and/or branched and/or cyclic ethers, preferably diethyl ether, dipropyl ether, tert-butyl methyl ether, tert-amyl methyl ether, tert-amyl ethyl ether, dimethoxyethane, diethoxyethane, diglyme, triglyme, furan, tetrahydrofuran, tetrahydromethylfuran, dioxolane, tetrahydrothiophene, tetrahydropyran, dioxane, methoxybenzene, methylthiobenzene, ethoxybenzene, and regioisomers thereof;

linear and/or branched and/or cyclic ketones, preferably trichloroacetone, butanone, pentanone, hexanone, heptanone, octanone, nonanone, cyclopentanone, cyclohexanone, acetophenone, acetylacetone, and regioisomers thereof; linear and/or branched and/or cyclic amines, preferably tert-butylamine, diaminoethane, diethylamine, triethylamine, tributylamine, pyrrolidine, piperidine, morpholine, N-methylaniline, N,N-dimethylaniline, and regioisomers thereof; hexamethyldisilane, diphenyldimethylsilane, chlorophenyltrimethylsilane, phenyltrimethylsilane, phenethyltris(trimethylsiloxy)silane, phenyltris(trimethylsiloxy)silane, polydimethylsiloxane, tetraphenyl tetramethyl trisiloxane, poly(3,3,3-trifluoropropylmethylsiloxane), 3,5,7-triphenylnonamethylpentasiloxane, 3,5-diphenyloctamethyltetrasiloxane, 1,1,5,5-tetraphenyl-1,3,3,5-tetramethyltrisiloxane, and hexamethylcyclotrisiloxane; hydrofluoroethers, chlorodifluoromethane, 1,1,1,2-tetrafluoroethane, pentafluoroethane, difluoromethane, trifluoromethane, 1,1,1,2,3,3,3-heptafluoropropane, 1,1-difluoroethane, 1,1,1,3,3,3-hexafluoropropane, and octafluoropropane; and mixtures of these solvents at any mixing ratio.

In particular, decane, dodecane, tridecane, tetradecane, decalin, tetralin, mixtures thereof, and materials containing these substances as essential components are preferred.

(Colorant)

Known pigments and dyes can be employed as the colorant contained in the colored liquid (A) used in the present invention; however, pigments are preferably employed in view of, for example, weather resistance. Usable pigments can be known organic or inorganic pigments. Colorants in which such pigments have been coated with resins can be also used.

Examples of the organic pigments include pigments composed of perylene-perinone-based compounds, pigments composed of quinacridone-based compounds, pigments composed of phthalocyanine-based compounds, pigments composed of anthraquinone-based compounds, pigments composed of phthalone-based compounds, pigments composed of dioxazine-based compounds, pigments composed of isoindolinone-based compounds, pigments composed of isoindoline-based compounds, pigments composed of diketopyrrolopyrrole-based compounds, pigments composed of insoluble azo-based compounds, pigments composed of soluble azo-based compounds, pigments composed of condensed azo-based compounds, and aniline black pigments. Specific examples of the organic pigments are as follows.

Examples of the pigments composed of perylene-perinone-based compounds include pigments such as C. I. Pigment Violet 29; C. I. Pigment Red 123, 149, 178, and 179; C. I. Pigment Black 31 and 32; and C. I. Pigment Orange 43.

Examples of the pigments composed of quinacridone-based compounds include pigments such as C. I. Pigment Violet 19 and 42; C. I. Pigment Red 122, 202, 206, 207, 209, and 282; and C. I. Pigment Orange 48 and 49.

Examples of the pigments composed of phthalocyanine-based compounds include pigments such as C. I. Pigment Blue 15, 15:1, 15:2, 15:3, 15:4, 15:6, and 16; and C. I. Pigment Green 7 and 36.

Examples of the pigments composed of anthraquinone-based compounds include pigments such as C. I. Pigment Blue 60, C. I. Pigment Yellow 24 and 108, C. I. Pigment Red 168 and 177, and C. I. Pigment Orange 40.

Examples of the pigments composed of phthalone-based compounds include pigments such as C. I. Pigment Yellow 138.

Examples of the pigments composed of dioxazine-based compounds include pigments such as C. I. Pigment Violet 23 and 37.

Examples of the pigments composed of isoindolinone-based compounds include pigments such as C. I. Pigment Yellow 109, 110, and 173; and C. I. Pigment Orange 61.

Examples of the pigments composed of isoindoline-based compounds include pigments such as C. I. Pigment Yellow 139 and 185, C. I. Pigment Orange 66, and C. I. Pigment Brown 38.

Examples of the pigments composed of diketopyrrolopyrrole-based compounds include pigments such as C. I. Pigment Red 254 and 255.

Examples of the pigments composed of insoluble azo-based compounds include pigments such as C. I. Pigment Yellow 1, 3, 12, 13, 14, 17, 55, 73, 74, 81, 83, 97, 130, 151, 152, 154, 156, 165, 166, 167, 170, 171, 172, 174, 175, 176, 180, 181, and 188; C. I. Pigment Orange 16, 36, and 60; C. I. Pigment Red 5, 22, 31, 112, 146, 150, 171, 175, 176, 183, 185, 208, and 213; C. I. Pigment Violet 43 and 44; and C. I. Pigment Blue 25 and 26.

Examples of the pigments composed of soluble azo-based compounds include pigments such as C. I. Pigment Red 53:1, 57:1, and 48.

Examples of the pigments composed of condensed azo-based compounds include pigments such as C. I. Pigment Yellow 93, 94, 95, 128, and 166; C. I. Pigment Orange 31; C. I. Pigment Red 144, 166, 214, 220, 221, 242, 248, and 262; and C. I. Pigment Brown 41 and 42.

An example of the aniline black pigments is C. I. Pigment Black 1.

Examples of the inorganic pigments include titanium oxide, zinc sulfide, white lead, zinc white, lithopone, antimony trixode, basic lead sulfate, basic lead silicate, barium sulfate, calcium carbonate, gypsum, silica, carbon black, black iron oxide, black titanium oxide, cobalt violet, vermilion, molybdenum orange, minium, bengala, chrome yellow, cadmium yellow, zinc chromate, yellow ocher, chromium oxide, ultramarine blue, Prussian blue, and cobalt blue.

Examples of the dyes include acid dyes such as C. I. Acid Black 1, 2, 7, 16, 17, 24, 26, 28, 31, 41, 48, 52, 58, 60, 63, 94, 107, 109, 112, 118, 119, 121, 122, 131, 155, and 156, C. I. Acid Yellow 1, 3, 4, 7, 11, 12, 13, 14, 17, 18, 19, 23, 25, 29, 34, 38, 40, 41, 42, 44, 49, 53, 55, 59, 61, 71, 72, 76, 78, 79, 99, 111, 114, 116, 122, 135, 142, 161, and 172, C. I. Acid Orange 7, 8, 10, 19, 20, 24, 28, 33, 41, 45, 51, 56, and 64, C. I. Acid Red 1, 4, 6, 8, 13, 14, 15, 18, 19, 21, 26, 27, 30, 32, 34, 35, 37, 40, 42, 44, 51, 52, 54, 57, 80, 82, 83, 85, 87, 88, 89, 92, 94, 97, 106, 108, 110, 111, 114, 115, 119, 129, 131, 133, 134, 135, 143, 143:1, 144, 152, 154, 155, 172, 176, 180, 184, 186, 187, 249, 254, 256, 289, 317, and 318, C. I. Acid Violet 7, 11, 15, 34, 35, 41, 43, 49, 51, and 75, C. I. Acid Blue 1, 7, 9, 15, 22, 23, 25, 27, 29, 40, 41, 43, 45, 49, 51, 53, 55, 56, 59, 62, 78, 80, 81, 83, 90, 92, 93, 102, 104, 111, 113, 117, 120, 124, 126, 138, 145, 167, 171, 175, 183, 229, 234, 236, and 249, C. I. Acid Green 3, 9, 12, 16, 19, 20, 25, 27, 41, and 44, and C. I. Acid Brown 4 and 14;

basic dyes such as C. I. Basic Black 2.8, C. I. Basic Yellow 1, 2, 11, 12, 14, 21, 32, and 36, C. I. Basic Orange 2, 15, 21, and 22, C. I. Basic Red 1, 2, 9, 12, 13, and 37, C. I. Basic Violet 1, 3, 7, 10, and 14, C. I. Basic Blue 1, 3, 5, 7, 9, 24, 25, 26, 28, and 29, C. I. Basic Green 1 and 4, and Basic Brown 1 and 12;

direct dyes such as C. I. Direct Black 2, 4, 9, 11, 14, 17, 19, 22, 27, 32, 36, 38, 41, 48, 49, 51, 56, 62, 71, 74, 75, 77, 78, 80, 105, 106, 107, 108, 112, 113, 117, 132, 146, 154, 168, 171, and 194, I. C. Direct Yellow 1, 2, 4, 8, 11, 12, 24, 26, 27, 28, 33, 34, 39, 41, 42, 44, 50, 51, 58, 72, 85, 86, 87, 88, 98, 100, 110, 127, 135, 141, 142, and 144, C. I. Direct Orange 6, 8, 10, 26, 29, 41, 49, 52, and 102, C. I. Direct Red 1, 2, 4, 8, 9, 11, 13, 15, 17, 20, 23, 24, 28, 31, 33, 37, 39, 44, 46, 47, 48, 51, 59, 62, 63, 73, 75, 77, 80, 81, 83, 84, 85, 87, 89, 90, 94, 95, 99, 101, 108, 110, 145, 189, 197, 220, 224, 225, 226, 227, 230, 250, 254, 256, and 257, C. I. Direct Violet 1, 7, 9, 12, 35, 48, 51, 90, and 94, C. I. Direct Blue 1, 2, 6, 8, 15, 22, 25, 34, 69, 70, 71, 72, 75, 76, 78, 80, 81, 82, 83, 86, 90, 98, 106, 110, 110, 120, 123, 158, 163, 165, 192, 193, 194, 195, 196, 199, 200, 201, 202, 203, 207, 218, 236, 237, 239, 246, 258, and 287, Direct Green 1, 6, 8, 28, 33, 37, 63, and 64, and C. I. Direct Brown 1A, 2, 6, 25, 27, 44, 58, 95, 10, 101, 106, 112, 173, 194, 195, 209, 210, and 211;

reactive dyes such as C. I. Reactive Black 1, 3, 5, 6, 8, 12, and 14, C. I. Reactive Yellow 1, 2, 3, 13, 14, 15, and 17, C. I. Reactive Orange 2, 5, 7, 16, 20, and 24, Reactive Red 6, 7, 11, 12, 15, 17, 21, 23, 24, 35, 36, 42, 63, 66, 84, and 184, C. I. Reactive Violet 2, 4, 5, 8, and 9, C. I. Reactive Blue 2, 5, 7, 12, 13, 14, 15, 17, 18, 19, 20, 21, 25, 27, 28, 37, 38, 40, and 41, and C. I. Reactive Green 5 and 7, and Reactive Brown 1, 7, and 16; and food dyes such as C. I. Food Black 1 and 2, C. I. Food Yellow 3, 4, and 5, C. I. Food Red 2, 3, 7, 9, 14, 52, 87, 92, 94, 102, 104, 105, and 106, C. I. Food Violet 2, C. I. Food Blue 1 and 2, and C. I. Food Green 2 and 3.

(Colorant: Amount)

In the colored liquid (A), the amount of the colorant is preferably in the range of 1 to 50 weight %, and more preferably 2 to 10 weight % relative to the solvent that is to be used.

Coating the pigment with resin enables stable dispersion of the pigment in a medium, which can impart enhanced color density to the colored liquid (A); as compared with a case in which the same pigment is used in the same amount, the degree of coloration can be enhanced.

(Coating Resin)

Any resin can be used for coating the above-mentioned pigment, and a variety of resins can be used. Examples thereof include polyvinyl-based resins, polyester-based resins, amino-based resins, acrylic resins, epoxy-based resins, polyurethane-based resins, polyether-based resins, polyamide-based resins, unsaturated polyester-based resins, phenol-based resins, silicone-based resins, and fluorine-based high molecular compounds. A technique for coating the pigment with a resin is not specifically limited, and known techniques can be employed for coating the pigment. Specific examples thereof include a technique in which a pigment is coated with the resin by changing the solubility of the resin through adding the pigment to a solution in which the resin has been dissolved, a technique in which a pigment is coated with a resin by subjecting the resin and the pigment to kneading, and a technique in which a pigment is coated with a resin through a reaction of a monomer, which is the material of the resin, in the presence of the pigment.

In a technique, for example, a reactive compound is adsorbed onto the surface of a pigment, and then a polymerization initiator is added to induce polymerization. In particular, for instance, a pigment coated with a resin can be produced through a first process in which a water-soluble polymer having a mercapto group on a molecular chain (main chain or side chain) of the polymer or at an end of the molecular chain or having a structure in which an azo-based polymerization initiator or a peroxide-based polymerization initiator has been introduced in a chemically bonded state, such as polyvinyl alcohol, hydroxyethyl cellulose, hydroxypropyl cellulose, or polyacrylic acid, is adsorbed onto the surfaces of pigment particles by dispersing the pigment particles in a solution of the water-soluble polymer and a second process in which layers of the polymer are formed on the surfaces of the pigment particles by adding a vinyl monomer, such as a vinyl aromatic compound, (meth)acrylic ester, a vinylcyan compound, or an N-substituted maleimide derivative, to the aqueous dispersion liquid of the pigment particles subjected to the adsorption to induce polymerization in the presence of a polymerization initiator.

In another technique, a polymerizable surfactant is used. In a specific example thereof, a pigment and polymerizable nonionic and anionic surfactants having a hydrophilic property are added to an aqueous organic solvent and/or water; the product is subjected to dispersion and wet grinding by ultrasonic waves or with a ball mill or a sand grinder; a monomer, such as an acrylic acid, an acrylic acid ester, a methacrylic acid, or a methacrylic acid ester, and a polymerization initiator are added optionally under grinding; and a polymerization reaction is carried out at 40 to 100° C. for 10 to 60 hours to produce a pigment coated with a resin.

In another technique, graft polymerization is carried out on the surface of a pigment. In a specific example thereof, a pigment subjected to a silane coupling treatment is allowed to react with a monomer, such as a methacrylic acid, methyl methacrylate, an acrylic acid, methyl acrylate, acrylonitrile, acrylamide, vinyl acetate, or N-vinylpyrrolidone, in an aqueous organic solvent and/or water to produce a pigment coated with a pigment.

In another technique, an amphoteric polymer and a pigment are dispersed in an organic solvent, and then the product is subjected to phase inversion emulsification into an aqueous phase. In a specific example thereof, a mixture containing a neutralized product of an organic high molecular compound and a pigment is used as an organic solvent phase, and self-dispersion (phase inversion emulsification) is induced by adding water to the organic solvent phase or adding the organic solvent phase to water to produce a pigment coated with a resin, the organic high molecular compound including polyvinyl-based resins, polyester-based resins, amino-based resins, acrylic resins, epoxy-based resins, polyurethane-based resins, polyether-based resins, polyamide-based resins, unsaturated polyester-based resins, phenol-based resins, silicone-based resins, and fluorine-based high molecular compounds and having an anionic group such as a carboxylic group, a sulfonate group, or a phosphonic acid group.

In another technique, a non-aqueous solvent is used as a solvent. In a specific example thereof, a pigment coated with a resin is produced through the following processes. A pigment optionally subjected to a surface treatment, such as a rosin treatment, a polymer treatment, a grafting treatment, or a plasma treatment, is dispersed in a non-aqueous solvent, such as hexane; octane; isooctane; decane; isodecane; decalin; nonane; dodecane; isododecane; Isopar E, G, H, and L manufactured by Exxon Mobil Corporation; Solutol manufactured by Phillips Petroleum Company; IP SOLVENT manufactured by Idemitsu Petrochemical Co., Ltd.; a petroleum naphtha, e.g., S.B.R. and Shellsol 70 and 71 manufactured by Shell Petrochemicals Company; or Pegasol manufactured by Exxon Mobil Corporation, in the form of fine particles to produce coloring fine particles. At least one monofunctional polymerizable monomer selected from vinyl esters or acryl esters of aliphatic carboxylic acids (e.g., acetic acid, propionic acid, butyric acid, monochloroacetic acid, and trifluoropropionic acid), which have 1 to 6 carbon atoms; alkyl esters or amides of unsaturated carboxylic acids such as acrylic acid, methacrylic acid, crotonic acid, itaconic acid, and maleic acid, which have 1 to 4 carbon atoms and may be optionally substituted; styrene derivatives; unsaturated carboxylic acids such as acrylic acid, methacrylic acid, crotonic acid, maleic acid, and itaconic acid; cyclic acid anhydrides of maleic acid and itaconic acid; acrylonitrile; methacrylonitrile; and heterocyclic compounds containing polymerizable double bond groups and a dispersion stabilizer which has a part that is solvated in the non-aqueous solvent and a part that is less likely to be solvated in the non-aqueous solvent and likely to be attached or adsorbed to resin particles that are to be generated through polymerization and which is soluble in the non-aqueous solvent are added to produce a dispersion liquid. The dispersion liquid is subjected to dispersion polymerization in the presence of a polymerization initiator with seed particles that are the coloring fine particles.

(Method for Producing Colored Liquid)

The colored liquid used in the present invention can be produced by known methods for producing a pigment dispersion.

The colored liquid can be produced, for instance, as follows: a mixture of the above-mentioned colorant, a solvent, and optionally a dispersant that serves for stabilization of dispersion is subjected to dispersion of the colorant with a traditional disperser such as a bead mill. The colored liquid can be also prepared by preliminarily producing a high-concentration dispersion liquid (mill base) with a traditional disperser such as a bead mill and then mixing the dispersion liquid with a nonpolar solvent under stirring to dilute the dispersion liquid to a predetermined viscosity.

In addition to a bead mill, a variety of known dispersers can be used as a stirrer and disperser for dispersing the pigment, such as an ultrasonic homogenizer, a high-pressure homogenizer, a paint shaker, a ball mill, a roll mill, a sand mill, a sand grinder, a Dyno-mill, a Dispermat, an SC mill, and a Nanomizer.

In the case where the colored liquid produced as described above has a low viscosity, a response speed of switching in optical modulation can be enhanced. For such an enhancement, the viscosity of the colored liquid is preferably less than 300 mPa·s, and more preferably less than 100 mPa·s at 25° C.

(Liquid (B) Immiscible with Colored Liquid)

In the case where the colored liquid (A) contains a polar solvent, a nonpolar solvent is normally employed as the liquid (B) used in the present invention. In the case where the colored liquid (A) contains a nonpolar solvent, a polar solvent is normally employed as the liquid (B).

Since the liquid (B) serves as a liquid used for showing the background of a display pattern as described above, the liquid (B) preferably has a higher light transmittance than the colored liquid (A) in terms of visibility. From this viewpoint, the liquid (B) is free from a colorant (a display pattern on a transparent background is obtained in this case) or may contain a colorant in an amount which does not have an effect on image display; for example, a colorant may be contained such that the liquid (B) has a higher transparency than the colored liquid (A).

In particular, in the case where a colored liquid composition which will be described later is black, the liquid (B) does not need to be colorless and may be colored provided that the liquid (B) has a transparency. For instance, a colorant having a high color purity, high color density, and high transparency can be used to produce the liquid (B) having a color of cyan, magenta, yellow, or optionally green or white.

Any colorant generally used as a coloring material can be employed, and organic pigments, inorganic pigments, and dyes used as a colorant for the colored liquid (A) can be employed. In the case of application to devices, a colorant having a hue different from that of the colored liquid (A) is preferably employed.

(Additive (C))

The additive (C) used in the present invention is at least one additive selected from fluorine-based surfactants and silicone-based surfactants. The additive (C) may be added to the colored liquid (A) and then mixed with the liquid (B), may be added to the liquid (B) and then mixed with the colored liquid (A), or may be simultaneously mixed with the colored liquid (A) and the liquid (B), without limitation.

(Fluorine-Based Surfactant)

The fluorine-based surfactant which can be used as the additive (C) in the present invention is particularly a fluorine-based surfactant that is a fluorine-based polymer having at least one functional group selected from the group consisting of fluorinated alkyl groups, fluorinated alkylene groups, fluorinated alkyl ether groups, and fluorinated alkylene ether groups.

The fluorinated alkyl groups collectively refer to alkyl groups of which all of the hydrogen atoms are substituted with fluorine atoms (perfluoroalkyl group) and alkyl groups of which some of the hydrogen atoms are substituted with fluorine atoms (e.g., $HCF_2CF_2CF_2CF_2$—) and may be linear or branched.

The fluorinated alkyl ether groups are groups in which the above-mentioned fluorinated alkyl groups contain oxygen atoms (e.g., $CF_3-(OCF_2CF_2)_2-$).

The fluorinated alkylene groups have a structure, for instance, in which divalent fluorinated alkyl groups having 1 to 3 carbon atoms and oxygen atoms are alternately connected to each other. The divalent fluorinated alkyl groups having 1 to 3 carbon atoms may be the same as or different from each other.

The fluorinated alkylene ether groups are groups in which the above-mentioned fluorinated alkylene groups contain oxygen atoms.

In general, fluorinated alkyl groups or fluorinated alkylene groups are hydrophobic and lipophobic. Hence, in order to allow a compound having a fluorinated alkyl group to work as a surfactant, the compatibility thereof with a variety of mediums (e.g., solution or resin) to which the compound is to be added needs to be maintained. In other words, the surfactant needs to have an amphiphilic group (lipophilic group and/or hydrophilic group).

Since either of a polar medium and a nonpolar medium can be used as a medium in the present invention, an amphiphilic group which needs to be contained in the fluorine-based surfactant varies. In such a fluorine-based surfactant, a polymer which enables a highly flexible combination of a fluorine-containing functional group and an amphiphilic group, which serves to maintain compatibility with a medium, is advantageously employed. Such a polymeric fluorine-based surfactant can be produced through copolymerization of a monomer (FM) having at least one functional group selected from the group consisting of fluorinated alkyl groups, fluorinated alkylene groups, fluorinated alkyl ether groups, and fluorinated alkylene ether groups, which will be described below, and a polymerizable group at one or two ends thereof with a monomer (HM) having an amphiphilic group.

Examples of monomer (FM) having at least one functional group selected from the group consisting of fluorinated alkyl groups, fluorinated alkylene groups, fluorinated alkyl ether groups, and fluorinated alkylene ether groups and a polymerizable group at one or two ends thereof include, but are not limited to, fluorinated hexylmethyl (meth)acrylate, 2-fluorinated hexylethyl (meth)acrylate, fluorinated octylmethyl (meth)acrylate, 2-fluorinated octylethyl (meth)acrylate, fluorinated butanediol di(meth)acrylate, fluorinated hexanediol (meth)acrylate, fluorinated hexanediol di(meth)acrylate, fluorinated polymethylene glycol mono(meth)acrylate, fluorinated polymethylene glycol di(meth)acrylate, fluorinated polyethylene glycol mono(meth)acrylate, fluorinated polyethylene glycol di(meth)acrylate, fluorinated polytetramethylene glycol mono(meth)acrylate, fluorinated polytetramethylene glycol di(meth)acrylate, adducts of fluorinated hexanol-2-isocyanatoethyl (meth)acrylate, adducts of fluorinated octanol-2-isocyanatoethyl (meth)acrylate, diadducts of fluorinated hexanediol-2-isocyanatoethyl (meth)acrylate, diadducts of fluorinated octanediol-2-isocyanatoethyl (meth) acrylate, adducts of bis(fluorinated hexyl)glycerine-2-isocyanatoethyl (meth)acrylate, diadducts of bis(fluorinated octyl) glycerine-2-isocyanatoethyl (meth)acrylate, adducts of fluorinated polymethylene glycol-2-isocyanatoethyl (meth) acrylate, diadducts of fluorinated polymethylene glycol-2-isocyanatoethyl (meth)acrylate, adducts of fluorinated polyethylene glycol-2-isocyanatoethyl (meth)acrylate, and diadducts of fluorinated polyethylene glycol-2-isocyanatoethyl (meth)acrylate. The term "being fluorinated" herein refers to a state in which some or all of the hydrogen atoms of an alkyl group or alkylene group are substituted with fluorine atoms. Those monomers (FM) may be used alone or in combination. Using di(meth)acrylate having a fluorinated alkylene group in an excessively large amount may cause gelation, and the amount thereof is therefore preferably small.

In the present invention, the term "(meth)acrylate" refers to acrylate and/or methacrylate unless otherwise specified.

Examples of the monomer (HM) having an amphiphilic group include monomers having alkyl groups, monomers having aromatic groups, monomers having polyoxyalkyl groups, monomers having polyoxyalkylene groups, monomers having polyorganosiloxane groups, (meth)acrylamide, and vinylpyridines; these may be appropriately used in combination.

Examples of the monomers having alkyl groups include alkyl esters of (meth)acrylic acid with 1 to 18 carbon atoms, such as methyl(meth)acrylate, ethyl(meth)acrylate, propyl (meth)acrylate, butyl (meth)acrylate, octyl (meth)acrylate, 2-ethylhexyl (meth)acrylate, decyl (meth)acrylate, dodecyl (meth)acrylate, and stearyl (meth)acrylate; bridged cycloalkyl esters of (meth)acrylic acid with 1 to 18 carbon atoms, such as dicyclopentanyloxylethyl (meth)acrylate, isobornyloxylethyl (meth)acrylate, isobornyl (meth)acrylate, adamantyl (meth)acrylate, dimethyladamantyl (meth)acrylate, dicyclopentanyl (meth)acrylate, and dicyclopentenyl (meth)acrylate; and alkylmaleimides such as maleimide, methylmaleimide, ethylmaleimide, propylmaleimide, butylmaleimide, hexylmaleimide, octylmaleimide, dodecylmaleimide, stearylmaleimide, and cyclohexylmaleimide.

Any monomer having a structure in which both a vinyl group and an aromatic ring that may have a substituent, such as a benzene ring or a naphthalene ring, are present in one molecule can be used as the monomer having an aromatic group. Examples thereof include styrene, benzyl (meth)acrylate, phenoxyethyl (meth)acrylate, 2-hydroxy-3-phenoxypropyl (meth)acrylate, phenoxy-polyethylene glycol (meth) acrylate, and nonylphenoxy-polyethylene glycol (meth) acrylate.

Examples of the monomers having polyoxyalkyl groups or polyoxyalkylene groups include polypropylene glycol mono (meth)acrylate, polytetramethylene glycol (meth)acrylate, poly(ethylene glycol.propylene glycol) mono(meth)acrylate, polyethylene glycol.polypropylene glycol mono(meth)acrylate, poly(ethylene glycol.tetramethylene glycol) mono (meth)acrylate, polyethylene glycol.polytetramethylene glycol mono(meth)acrylate, poly(propylene glycol.tetramethylene glycol) mono(meth)acrylate, polypropylene glycol.polytetramethylene glycol mono(meth)acrylate, poly(propylene glycol.butylene glycol) mono(meth) acrylate, polypropylene glycol.polybutylene glycol mono (meth)acrylate, poly(ethylene glycol.butylene glycol) mono (meth)acrylate, polyethylene glycol.polybutylene glycol mono(meth)acrylate, poly(tetraethylene glycol.butylene glycol) mono(meth)acrylate, polytetraethylene glycol.polybutylene glycol mono(meth)acrylate, polybutylene glycol mono (meth)acrylate, poly(ethylene glycol.trimethylene glycol) mono(meth)acrylate, polyethylene glycol.polytrimethylene glycol mono(meth)acrylate, poly(propylene glycol.trimethylene glycol) mono(meth)acrylate, polypropylene glycol.polytrimethylene glycol mono(meth)acrylate, poly(trimethylene glycol.tetramethylene glycol) mono(meth)acrylate, polytrimethylene glycol.polytetramethylene glycol mono (meth)acrylate, poly(butylene glycol.trimethylene glycol) mono(meth)acrylate, and polybutylene glycol.polytrimethylene glycol mono(meth)acrylate.

Examples of the monomers having polyorganosiloxane groups include silane coupling group-containing monomers such as 3-(meth)acryloxypropyltrimethoxysilane, 3-(meth) acryloxypropylmethyldimethoxysilane, 3-(meth)acryloxypropyldimethylmethoxysilane, 3-(meth)acryloxypropyltriethoxysilane, 3-(meth)acryloxypropylethyldiethoxysilane, 3-(meth)acryloxypropyldiethylethoxysilane, 3-(meth)acryloxypropylmethyldiethoxysilane, 3-(meth)acryloxypropyltrichlorosilane, 3-(meth)acryloxypropylmonomethyldichlorosilane, 3-(meth)acryloxypropyldimethylchlorosilane, 3-(meth)acryloxypropylmonoethyldichlorosilane, and 3-(meth)acryloxypropyldiethylchlorosilane; and silicone chain-containing monomers such as 3-(1,1,2,2,2-pentamethyldisiloxy)-propyl(meth)acrylate, 3-(2,2,2-trimethyl-1,1-diphenyldisiloxy)-propyl(meth)acrylate, 3-(1,2,2,2-tetramethyl-1-phenyldisiloxy)-propyl(meth)acrylate, 3-(2,2,2-trimethyl-1,1-dipropyldisiloxy)propyl(meth)acrylate, 3-(2,2,2-trimethyl-1,1-dioctyldisiloxy)-propyl(meth)acrylate, 3-(2,2,2-trimethyl-1,1-didodecyldisiloxy-propyl(meth)acrylate, 3-(1,1,2,2,3,3,3-heptamethyltrisiloxy-propyl(meth)acrylate, 2-(2-(1,1,2,2,2-pentamethyldisiloxy)ethoxy)ethyl (meth)acrylate, and 1,1-trifluoromethyl-3-(1,1,2,2,2-pentamethyldisiloxy)-propyl(meth)acrylate.

Examples of the (meth)acrylamide include (meth)acrylamide, N-methyl(meth)acrylamide, N-ethyl(meth)acrylamide, N-propyl(meth)acrylamide, N-butyl(meth)acrylamide, N-hexyl(meth)acrylamide, N-octyl(meth)acrylamide, N-dodecyl(meth)acrylamide, N-ethoxymethyl(meth)acrylamide, N-2-ethoxyethyl(meth)acrylamide, N-2-(2-hydroxyethoxy)ethyl(meth)acrylamide, N-methylol(meth)acrylamide, and 6-acrylamidohexanoic acid.

Examples of the vinylpyridines include 2-vinylpyridine, 3-vinylpyridine, 4-vinylpyridine, 6-methyl-2-ethenylpyridine, 6-ethyl-2-ethenylpyridine, and 1-vinylpyridine-2(1H)-one.

The fluorine-based surfactant can be produced through copolymerization of the above-mentioned monomers by known methods, and commercially available products can be also used. In an example of copolymerization methods, the above-mentioned monomer (FM), the above-mentioned monomer (HM), and optionally another polymerizable monomer are polymerized in an organic solvent with the aid of a radical polymerization initiator. It is preferred that the organic solvent used in this case be ketones, esters, amides, sulfoxides, ethers, and hydrocarbons. Specific examples thereof include acetone, methyl ethyl ketone, methyl isobutyl ketone, cyclohexanone, ethyl acetate, butyl acetate, propylene glycol monomethyl ether acetate, dimethylformamide, dimethylacetamide, N-methylpyrrolidone, dimethyl sulfoxide, diethyl ether, diisopropyl ether, tetrahydrofuran, dioxane, toluene, and xylene. These materials are appropriately selected in view of the boiling point, compatibility, and polymerization properties. Examples of the radical polymerization initiator include peroxides such as benzoyl peroxide and azo compounds such as azobisisobutyronitrile. In addition, a chain transfer agent such as lauryl mercaptan, 2-mercaptoethanol, thioglycerol, ethylthioglycolic acid, or octylthioglycolic acid may be optionally used.

Examples of the commercially available products include MEGAFAC manufactured by DIC Corporation, SURFLON manufactured by AGC SEIMI CHEMICAL CO., LTD., FTERGENT manufactured by NEOS COMPANY LIMITED, and Novec manufactured by 3M Company.

The number average molecular weight (Mn) and weight average molecular weight (Mw) of the fluorine-based surfactant used in the present invention are not specifically limited and can be appropriately determined on the basis of, for example, the intended viscosity of the composition after addition of the surfactant to a nonpolar solvent. For example, the number average molecular weight (Mn) is preferably in the range of 500 to 20,000, and more preferably 1,500 to 10,000.

The weight average molecular weight (Mw) is preferably in the range of 2,000 to 100,000, and more preferably 3,000 to 50,000. The number average molecular weight (Mn) and the weight average molecular weight (Mw) are values determined by gel permeation chromatography (hereafter, abbreviated as "GPC") in terms of polystyrene. In GPC, a measurement apparatus "HLC-8220 GPC" manufactured by TOSOH CORPORATION is used, and monodisperse polystyrene is used as a standard sample.

The total fluorine content in the monomer (FM), monomer (HM), and another optional polymerizable monomer which are used as the materials of the fluorine-based surfactant is also not specifically limited and appropriately determined on the basis of, for example, the intended viscosity of the composition after addition of the surfactant to a nonpolar solvent. The fluorine atom content in the fluorine-based polymer can be calculated as follows: the fluorine-based polymer is decomposed by being burned, then the decomposed product is subjected to extraction with water or alkaline water, and the concentration of the fluorine ion is determined by ion chromatography.

(Fluorine-based Surfactant: Amount)

The amount of the fluorine-based surfactant is preferably in the range of 0.0005 to 10 weight %, more preferably 0.0001 to 5 weight %, and further preferably 0.001 to 2 weight % relative to the separated colored liquid composition containing the colored liquid (A) and the liquid (B) immiscible with the colored liquid.

(Silicone-Based Surfactant)

Examples of the silicone-based surfactants which can be used as the additive (C) in the present invention include surfactants in which both a silicone chain and an amphiphilic group are contained in the molecules thereof. In particular, alkylene oxide-modified polyorganosiloxane in which alkylene oxide has been added to the silicone main chain and which is represented by Formula (1) is preferred, and alkylene oxide-modified polydimethylsiloxane is more preferred.

[Chem. 1]

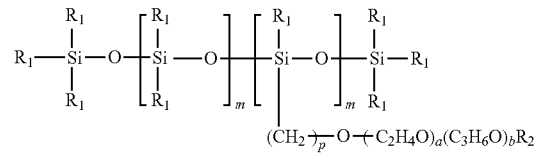

(1)

In Formula (1), each $R_1$ represents a hydrogen atom or an alkyl group or aryl group having 1 to 15 carbon atoms and may be different from each other, $R_2$ represents a hydrogen atom or an alkyl group or aryl group having 1 to 15 carbon atoms, and m, n, p, a, and b each independently represent an integer for a repeating unit; m is a positive number that satisfies $1 \le m \le 100$, n is a positive number that satisfies $1 \le n \le 100$, p is a positive number that satisfies $0 \le p \le 10$, a is a positive number that satisfies $1 \le a \le 100$, and b is a positive number that satisfies $0 \le b \le 100$.

The silicone-based surfactants may be commercially available products; for example, polyether-modified silicone manufactured by Dow Corning Toray Co., Ltd. or Shin-Etsu Chemical Co., Ltd. can be employed.

In the present invention, the HLB value of the silicone-based surfactant is preferably not less than 4, and more preferably 4 to 14. At an HLB value lower than four, aggregates may be generated at the interface between the colored liquid and the liquid immiscible with the colored liquid, which may adversely affect electrowetting properties. At an HLB value greater than 14, a colorant adheres to a glass substrate, which may adversely affect electrowetting properties.

An HLB value is used as an index for the hydrophilic and lipophilic properties of surfactants, and some calculation methods thereof have been proposed. In the present invention, any calculation method can be employed. Commercially available surfactants, for example, specify their HLB, and such HLB can be employed as the index. The HLB of a surfactant which does not have specification of its HLB can be obtained by calculation. Representative examples of a method for calculating HLB include "Griffin's method", "Kawakami's method", and "Davies' method" (see materials (S-1) to (S-7): *Shinkaimenkasseizai*; SANKYO PUBLISHING CO., Ltd., Oct. 10, 1975 and (S-8) to (S-15): *Hiionkaimenkasseizai*; Seibundo Shinkosha Publishing Co., Ltd., Oct. 25, 1962). In Griffin's method, HLB is determined from the saponification value of a product and the acid value of an acid; for instance, the HLB value of a nonionic surfactant can be calculated from the following formula in which Griffin's method is applied to a surfactant having an ethylene oxide chain.

$$HLB=[\{(\text{molecular weight of ethylene oxide chain})/(\text{molecular weight of surfactant})\}\times 100]/5 \quad [\text{Math. 1}]$$

(Silicone-based Surfactant: Amount)

In order to provide the effect of the present invention, the amount of the silicone-based surfactant can be at least not less than 0.0005 weight % relative to the separated colored liquid composition containing the colored liquid (A) and the liquid (B) immiscible with the colored liquid. At an amount less than 0.0005 weight %, there is a fear in which the interface between the colored liquid (A) and the liquid (B) is not stably formed. The amount may be at most 5 weight %, preferably in the range of 0.005 to 3 weight %, and more preferably 0.01 to 1 weight %. At an amount greater than 5 weight %, the separated colored liquid composition becomes clouded, which may adversely affect electrowetting properties.

Addition of the additive (C) that serves for surface activity enables adjustment of the interfacial tension between the colored liquid (A) and the liquid (B). The fluorine-based surfactant and silicone-based surfactant that serve as the additive (C) well work for the adjustment of interfacial tension, and addition thereof in a small amount therefore enables intended interfacial tension; hence, electrowetting properties are not adversely affected. The additive (C) is present at the interface between the colored liquid (A) and the liquid (B) and therefore can prevent the intrusion of a colorant contained in the colored liquid into the liquid (B) across the interface; thus, optical modulation by a droplet of the colored liquid (A) put in the liquid (B) can be stably maintained.

(Additive (C): Addition Method)

The additive (C) may be added to one or both of the colored liquid (A) and the liquid (B) by any known addition method at any time. In a process for producing the colored liquid (A), for example, the additive (C) may be preliminarily dissolved in or mixed with part of a solvent before a colorant is dispersed or dissolved in a solvent, and then the solution may be diluted with the rest of the solvent; alternatively, the additive (C) is directly dissolved in or mixed with the colored liquid (A) in which a colorant has been dispersed or dissolved. In the case where the additive (C) is added to the liquid (B), the additive (C) can be directly added to the liquid (B). Furthermore, after the colored liquid (A) is mixed with the liquid (B) to produce the separated colored liquid composition, the additive (C) can be added thereto by known methods.

(Other Additives)

The separated colored liquid composition of the present invention may further contain other additives such as a surfactant, a dispersant, a humectant, a thickener, a preservative, a viscosity stabilizer, a grinding aid, a filler, a suspending agent, a photoprotective agent, an antioxidant, a biocide, a degasser/antifoamer, a defoaming agent, and an antibaking agent provided that the effect of the present invention is not impaired. Such additives are desirably added such that electrical conductivity is not increased. Examples of usable dispersants include polyamides, polyesters, polyacrylates, polyvinyloxazolidones, polystyrenes, polyepoxides, polyurethanes, and polyvinyl halogens. Examples of commercially available dispersants include, but are not limited to, Solsperse manufactured by The Lubrizol Corporation, Tegosperse manufactured by Evonik Industries AG, EFKA manufactured by BASF, and DISPERBYK manufactured by BYK.

(Electrowetting Device)

The separated colored liquid composition of the present invention can be suitably used in electrowetting devices in which an external electric field is utilized to move the colored liquid composition. In particular, use of a pigment as the colorant, for example, further enhances light resistance and is therefore preferred. Particularly in the case where the separated colored liquid composition is used in image display devices, dispersion stability that is the effect of the present invention desirably enables the devices to be stably driven for a long time to a maximum extent.

An example of electrowetting devices in which the separated colored liquid composition can be used will now be described.

A displaying space is provided between layers having electrodes, and the displaying space is filled with the separated colored liquid composition.

The layer positioned on the displaying side of the displaying space is, for example, a transparent layer through which the colored liquid composition can be seen; on the other hand, the layer positioned on the non-displaying side is a light scattering layer. Application of voltage to the colored liquid composition moves the colored liquid composition to the displaying side of the space by an electrowetting phenomenon or increases the surface area of the colored liquid composition on the displaying side, thereby carrying out color display.

In the case where the liquid composition contains light scattering molecules and is therefore in the form of a light scattering fluid, use of the light scattering layer on the non-displaying side can be precluded.

In particular, an upper layer that is on the displaying side, an intermediate layer having a through-hole and formed of a light scattering material, and a lower layer are provided; an upper space on the displaying side is provided between the upper layer and the intermediate layer, and a lower space is provided between the intermediate layer and the lower layer; and the lower space, the through-hole, and the upper space constitute a sealed liquid reservoir having a communication channel. The liquid reservoir holds the separated colored liquid composition. The upper and lower spaces are in communication with each other through the through-hole that serves as a channel of the colored liquid composition, and application or non-application of voltage to the colored liquid composition allows the colored liquid composition to flow into or out of the upper space on the displaying side on the basis of an electrowetting technique. The flow of the colored liquid composition into the upper space enables displaying of a color image, and the flow of the colored liquid composition out of the upper space enables a white displaying mode due to the light scattering by the light scattering material.

The device can have a two-terminal structure in which the upper layer is provided with an electrode and in which another electrode is provided inside the through-hole, the two terminals are connected to each other via a switch, and turning on and off the switch enables the colored liquid composition to flow into the upper space on the displaying side to display a color image and enables the colored liquid composition to flow out of the upper space to change the display mode to a scattering white display mode. Alternatively, the device may have a three-terminal structure in place of such a two-terminal structure.

In the three-terminal structure, an upper electrode is disposed on the upper surface and/or lower surface of the upper space, a lower electrode is disposed on the upper surface and/or lower surface of the lower space, and a common electrode is disposed along the inner surface of a through-hole of the white scattering sheet. The display device may include an upper power supply circuit connected to the common electrode and the upper electrode and having a circuit opening/closing unit and a lower power supply circuit connected to the common electrode and the lower electrode and having a circuit opening/closing unit, in which alternately opening and closing the circuit opening/closing units of the upper power supply circuit and lower power supply circuit controls the flow of the colored liquid composition into and out of the upper space. In such a three-terminal structure, the colored liquid composition is allowed to flow into and out of the upper space owing to the alternate opening and closing by the upper power supply circuit and the lower power supply circuit, so that the colored liquid composition can be allowed to rapidly flow into and out of the upper space.

Even in the case where the device has any of the above-mentioned structures, a dielectric layer can be also disposed on the colored liquid composition-contacting side of each electrode. It is preferred that the dielectric layer, for example, contain parylene or alumina and have a thickness ranging from approximately 1 to 0.1 μm. In the case where a water-repellent film that serves as a hydrophilic layer at application of voltage is disposed on the surface of the dielectric layer and where the water-repellent film contacts the colored liquid composition, the colored liquid composition can quickly move, or the surface area of the colored liquid composition can be promptly changed; hence, such a structure is suitable for displaying moving images.

In the device, the displaying space is divided by partitions into pixels. The colored liquid composition used in each pixel is in the form of a colored liquid of any of R, G and B or C, M, Y, and K. The colored liquid composition is introduced into the displaying space and then spreads to display full-color images, and the colored liquid composition is rapidly moved to display a full-color moving images.

In addition, the device may have a structure in which a color filter of any of R, G, and B or C, M, Y, and K is formed before and after the passage of light through the displaying space to further carry out optical modulation.

EXAMPLES

The present invention will now be described further in detail with reference to Examples but is not limited thereto. The term "%" in Examples is on a mass basis. In Synthesis Examples, the weight average molecular weight (Mw) and number average molecular weight (Mn) were determined through measurement by GPC under the following conditions.

[Conditions in Measurement by GPC]
Measurement Apparatus: "HLC-8220 GPC" manufactured by TOSOH CORPORATION
Column: Guard Column "HHR-H" (6.0 mm I. D.×4 cm) manufactured by TOSOH CORPORATION+
"TSK-GEL GMHHR-N" (7.8 mm I. D.×30 cm) manufactured by TOSOH CORPORATION+
"TSK-GEL GMHHR-N" (7.8 mm I. D.×30 cm) manufactured by TOSOH CORPORATION+
"TSK-GEL GMHHR-N" (7.8 mm I. D.×30 cm) manufactured by TOSOH CORPORATION+
"TSK-GEL GMHHR-N" (7.8 mm I. D.×30 cm) manufactured by TOSOH CORPORATION+
"TSK-GEL GMHHR-N" (7.8 mm I. D.×30 cm) manufactured by TOSOH CORPORATION
Detector: ELSD ("ELSD2000" manufactured by Alltech Corporation)
Data processing: "GPC-8020 model II data analysis version 4.30" manufactured by TOSOH CORPORATION
Measurement Conditions: Column Temperature 40° C.
Eluent tetrahydrofuran (THF)
Flow rate 1.0 ml/min
Sample: 1.0% tetrahydrofuran solution in terms of resin solid content was filtered through a microfilter (5 μl)
Standard sample: in accordance with the measurement manual of "GPC-8020 model II data analysis version 4.30", the following monodisperse polystyrenes having known molecular weights were used
(Monodisperse Polystyrene)
"A-500" manufactured by TOSOH CORPORATION
"A-1000" manufactured by TOSOH CORPORATION
"A-2500" manufactured by TOSOH CORPORATION
"A-5000" manufactured by TOSOH CORPORATION
"F-1" manufactured by TOSOH CORPORATION
"F-2" manufactured by TOSOH CORPORATION
"F-4" manufactured by TOSOH CORPORATION
"F-10" manufactured by TOSOH CORPORATION
"F-20" manufactured by TOSOH CORPORATION
"F-40" manufactured by TOSOH CORPORATION
"F-80" manufactured by TOSOH CORPORATION
"F-128" manufactured by TOSOH CORPORATION
"F-288" manufactured by TOSOH CORPORATION
"F-550" manufactured by TOSOH CORPORATION Synthesis Example 1

Into a glass flask having a stirrer, a thermometer, a cooling pipe, and a dropping unit, 20 g of a perfluoroalkylene polyether compound represented by Formula (X-1) and having hydroxyl groups at the two ends thereof, 20 g of diisopropyl ether that served as a solvent, 0.02 g of p-methoxyphenol that served as a polymerization inhibitor, and 3.1 g of triethylamine that served as a neutralizer were put, stirring of the contents was started under air flow, and 2.7 g of acrylic acid chloride was dropped thereinto for an hour while the temperature inside the flask was kept at 10° C. After the dropping, the product was stirred for an hour at 10° C., further stirred for an hour at an increased temperature of 30° C., and then further stirred for 10 hours at an increased temperature of 50° C. to induce a reaction. Then, elimination of acrylic acid chloride was confirmed through analysis by gas chromatography. Then, 40 g of diisopropyl ether that served as a solvent was added to the product, and the product was subsequently washed as follows: 80 g of ion exchanged water was mixed with the product, the product was stirred and then left to stand to separate a water layer, and the water layer was removed.

The washing was repeated three times. Then, 0.02 g of p-methoxyphenol that served as a polymerization inhibitor was added to the product, 8 g of magnesium sulfate that served as a dehydrating agent was added thereto, the product was left to stand for a day to be completely dehydrated, and the dehydrating agent was subsequently removed by filtration. Then, the solvent was distilled off under reduced pressure to yield a polymerizable monomer (M-1) represented by Formula (X-2) and having a poly(perfluoroalkylene ether) chain and acryloyl groups at the two ends thereof.

[Chem. 2]

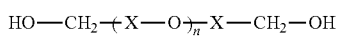
(X-1)

[Chem. 3]

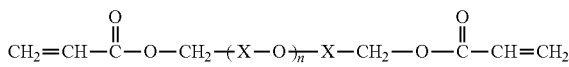
(X-2)

(where X represents a perfluoromethylene group or a perfluoroethylene group, seven perfluoromethylene groups or eight perfluoroethylene groups were present per molecule on average, the number of fluorine atoms was 46 on average. In addition, the number average molecular weight measured by GPC was 1,500.)

Synthesis Example 2

Into a glass flask having a stirrer, a thermometer, a cooling pipe, and a dropping unit, 30 g of a block copolymer of ethylene oxide with propylene oxide, which is represented by Formula (Y-1), 2.8 g of acrylic acid, 64 g of toluene that served as a solvent, 0.03 g of phenothiazine that served as a polymerization initiator, and 0.6 g of methanesulfonic acid that served as a catalyst were put, stirring of the contents was started under air flow, and the product was heated to 120° C. and refluxed for dehydration.

After removal of 0.63 g of the moisture was confirmed, the product was cooled to 65° C. and neutralized with triethylamine. After the neutralization, the product was heated to 85° C. and mixed with 2.3 g of ion exchanged water to be separated into layers. The underlayer was extracted, and the pH thereof was measured. Until the pH became not less than seven, the extracted product was repeatedly washed. The product was cooled to 30° C., and the solvent was distilled off under reduced pressure to yield a polymerizable monomer (M-2) represented by Formula (Y-2).

[Chem. 4]

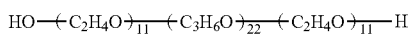
(Y-1)

[Chem. 5]

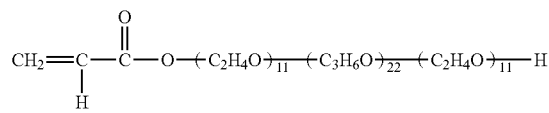
(Y-2)

Synthesis Example 3

Synthesis of Fluorine-Based Surfactant (CF-1)

Into a glass flask having a stirrer, a condenser, dropping units, and a thermometer, 133 g of methyl isobutyl ketone was put, and the temperature was increased to 90° C. while the content was stirred under nitrogen flow. Then, 50 g of 3,3,4,4,5,5,6,6,7,7,8,8,8-tridecafluorooctyl acrylate (hereinafter referred to as TDFOA) and two liquids including a monomer solution in which 50 g of stearyl acrylate had been dissolved in 80 g of methyl isobutyl ketone and a radical polymerization initiator solution in which 6 g of t-butylperoxy-2-ethylhexanoate had been dissolved in 20 g of methyl isobutyl ketone were placed in the different dropping units, and each liquid was simultaneously dropped for 2 hours while the temperature inside the flask was kept at 90° C. After the dropping, the product was stirred at 90° C. for 10 hours, and then the solvent was removed under reduced pressure to yield a fluorine-based surfactant (CF-1). The fluorine-based surfactant (CF-1) had a number average molecular weight of 3,800 and a weight average molecular weight of 7,500.

Synthesis Example 4

Synthesis of Fluorine-Based Surfactant (CF-2)

Into a glass flask having a stirrer, a thermometer, a cooling pipe, and dropping units, 297.5 g of methyl isobutyl ketone was put, and the temperature was increased to 105° C. while the content was stirred under nitrogen flow. Then, three liquids including 59.5 g of the polymerizable monomer (M-1) produced in Synthesis Example 1, a monomer solution in which 238 g of polypropylene glycol monomethacrylate had been dissolved in 154.4 g of methyl isobutyl ketone, and a polymerization initiator solution which served as a radical polymerization initiator and in which 44.6 g of t-butylperoxy-2-ethylhexanoate had been dissolved in 100.6 g of methyl isobutyl ketone were placed in the different dropping units, and each liquid was simultaneously dropped for 2 hours while the temperature inside the flask was kept at 105° C. After the dropping, the product was stirred at 105° C. for 10 hours, and then the solvent was distilled off under reduced pressure to yield a fluorine-based surfactant (CF-2). The molecular weight of the fluorine-based surfactant (CF-2) was measured by GPC (molecular weight in terms of polystyrene); the number average molecular weight was 2,500, and the weight average molecular weight was 6,000.

Synthesis Example 5

Synthesis of Fluorine-Based Surfactant (CF-3)

Into a glass flask having a stirrer, a condenser, dropping units, and a thermometer, 200 g of toluene was put, and the temperature was increased to 105° C. while the content was stirred under nitrogen flow. Then, 31 g of TDFOA and two liquids including a monomer solution in which 69 g of the polymerizable monomer (M-2) produced in Synthesis Example 2 had been dissolved in 125 g of toluene and a radical polymerization initiator solution in which 8 g of t-butylperoxy-2-ethylhexanoate had been dissolved in 20 g of toluene were placed in the different dropping units, and each liquid was simultaneously dropped for 2 hours while the temperature inside the flask was kept at 105° C. After the dropping, the product was stirred at 105° C. for 13 hours, and then the solvent was distilled off under reduced pressure to yield a fluorine-based surfactant (CF-3). The molecular weight of the fluorine-based surfactant (CF-3) was measured by GPC (molecular weight in terms of polystyrene); the number average molecular weight was 5,400 and the weight average molecular weight was 10,700.

Synthesis Example 6

Synthesis of Fluorine-Based Surfactant (CF-4)

Into a glass flask having a stirrer, a condenser, dropping units, and a thermometer, 200 g of toluene was put, and the temperature was increased to 105° C. while the content was stirred under nitrogen flow. Then, 37 g of TDFOA and two liquids including a monomer solution in which 63 g of the polymerizable monomer (M-1) produced in Synthesis Example 1 had been dissolved in 125 g of toluene and a radical polymerization initiator solution in which 8 g of t-butylperoxy-2-ethylhexanoate had been dissolved in 20 g of toluene were placed in the different dropping units, and each liquid was simultaneously dropped for 2 hours while the temperature inside the flask was kept at 105° C. After the dropping, the product was stirred at 105° C. for 13 hours, and then the solvent was distilled off under reduced pressure to yield a fluorine-based surfactant (CF-4). The molecular weight of the fluorine-based surfactant (CF-4) was measured by GPC (molecular weight in terms of polystyrene); the number average molecular weight was 5,000 and the weight average molecular weight was 10,100.

Synthesis Example 7

Synthesis of Fluorine-Based Surfactant (CF-5)

Into a glass flask having a stirrer, a condenser, dropping units, and a thermometer, 133 g of methyl isobutyl ketone was put, and the temperature was increased to 90° C. while the content was stirred under nitrogen flow. Then, 32 g of TDFOA and two liquids including a monomer solution in which 68 g of propylene glycol.polybutylene glycol monomethacrylate having an oxypropylene moiety of which the number of the repeating unit was one and oxybutylene moieties of which the average number of the repeating unit was 6 had been dissolved in 80 g of methyl isobutyl ketone and a radical polymerization initiator solution in which 6 g of t-butylperoxy-2-ethylhexanoate had been dissolved in 20 g of methyl isobutyl ketone were placed in the different dropping units, and each liquid was simultaneously dropped for 2 hours while the temperature inside the flask was kept at 90° C. After the dropping, the product was stirred at 90° C. for 10 hours, and then the solvent was removed under reduced pressure to yield a fluorine-based surfactant (CF-5). The fluorine-based surfactant (CF-5) had a number average molecular weight of 3,600 and a weight average molecular weight of 9,500.

Synthesis Example 8

Synthesis of Fluorine-Based Surfactant (CF-6)

Into a glass flask having a stirrer, a thermometer, a cooling pipe, and dropping units, 297.5 g of methyl isobutyl ketone was put, and the temperature was increased to 105° C. while the content was stirred under nitrogen flow. Then, three liquids including 45 g of TDFOA, a monomer solution in which 55 g of polyethylene glycol monoacrylate having oxyethylene units (average number of repeating units: 10) had been dissolved in 154.4 g of methyl isobutyl ketone, and a polymerization initiator solution which served as a radical polymerization initiator and in which 6 g of t-butylperoxy-2-ethylhexanoate had been dissolved in 100.6 g of methyl isobutyl ketone were placed in the different dropping units, and each liquid was simultaneously dropped for 2 hours while the temperature inside the flask was kept at 105° C. After the dropping, the product was stirred at 105° C. for 10 hours, and then the solvent was distilled off under reduced pressure to yield a fluorine-based surfactant (CF-6). The molecular weight of the fluorine-based surfactant (CF-6) was measured by GPC (molecular weight in terms of polystyrene); the number average molecular weight was 2,800, and the weight average molecular weight was 6,700.

Synthesis Example 9

Synthesis of Fluorine-Based Surfactant (CF-7)

Into a glass flask having a stirrer, a thermometer, a cooling pipe, and dropping units, 200 g of methyl isobutyl ketone was put, and the temperature was increased to 105° C. while the content was stirred under nitrogen flow. Then, three liquids including 30 g of TDFOA, a monomer solution in which 70 g of polypropylene glycol monoacrylate having oxypropylene units (average number of repeating units: 6) had been dissolved in 100 g of methyl isobutyl ketone, and a polymerization initiator solution which served as a radical polymerization initiator and in which 6 g of t-butylperoxy-2-ethylhexanoate had been dissolved in 100 g of methyl isobutyl ketone were placed in the different dropping units, and each liquid was simultaneously dropped for 2 hours while the temperature inside the flask was kept at 105° C. After the dropping, the product was stirred at 105° C. for 10 hours, and then the solvent was distilled off under reduced pressure to yield a fluorine-based surfactant (CF-7). The molecular weight of the fluorine-based surfactant (CF-7) was measured by GPC (molecular weight in terms of polystyrene); the number average molecular weight was 39,000, and the weight average molecular weight was 107,000.

(Silicone-based Surfactants (CS-1) to (CS-6) and CSH-1))

The following polyether-modified silicone oils manufactured by Shin-Etsu Silicone were used as silicone-based surfactants.

(CS-1): KF-354L (HLB=16)
(CS-2): KF-640 (HLB=14)
(CS-3): KF-351A (HLB=12)
(CS-4): KF-615A (HLB=10)
(CS-5): KF-352A (HLB=7)
(CS-6): KF-945 (HLB=4)
(CS-7): X-22-2516 (HLB=1)

Synthesis Example 10

Synthesis of Acrylic Resin Solution (D-1) Used for Coating Pigment

Into a four-necked flask having a thermometer, a stirrer, a reflux condenser, and a nitrogen gas-introducing pipe, 40.8 g of butyl acetate was put and heated to 80° C. After the temperature reached 80° C., a mixture of 57 g of stearyl acrylate, 3 g of dimethylaminoethyl methacrylate, 0.4 g of 2,2'-azodis(2-methylbutyronitrile), and 19.2 g of butyl acetate was dropped thereinto for 4 hours. After the dropping, the temperature is increased to 90° C., and the same temperature was maintained for 10 hours to promote a reaction.

The temperature of the reaction liquid was decreased to 50° C., a solution in which 0.01 g of t-butylpyrocatechol had been dissolved in 0.9 g of butyl acetate was added to the reaction liquid, and 0.9 g of glycidyl methacrylate was further added thereto. Then, the temperature was increased to 80° C., and the reaction was performed at the same temperature for 10 hours to yield an acrylic resin solution (D-1).

(Synthesis Example 11

Synthesis of Resin (D-2) Used for Dispersion

Into a reaction vessel having a stirrer, a dropping unit, and a reflux unit, 100 g of methyl ethyl ketone was put, and the inside of the reaction vessel was purged with nitrogen under stirring. The temperature was increased while the inside of the reaction vessel was maintained in the nitrogen atmosphere, and the inside of the reaction vessel was allowed to enter a state in which the methyl ethyl ketone was refluxed. Then, a mixture liquid of 86 g of styrene, 6 g of acrylic acid, 7.9 g of methacrylic acid, 0.1 g of butyl acrylate, and 8 g of a polymerization catalyst (2,2'-azodis(2-methylbutyronitrile)) was dropped thereinto with the dropping unit for 2 hours. Once the temperature of the reaction system reached 80° C. in the dropping, the temperature was maintained.

After the dropping, the reaction was further continued at the same temperature for 25 hours. In the middle of the reaction, consumption of the materials was checked, and the polymerization catalyst was appropriately added. After the reaction, the methyl ethyl ketone was distilled off under reduced pressure, and the produced solid was ground to yield powder of a styrene-acrylic acid copolymer (D-2).

Through this process, the styrene-acrylic acid resin (D-2) in which styrene/acrylic acid/methacrylic acid/butyl acrylate was 86/6/7.9/0.1 (weight %) and which had a weight average molecular weight of 11000 and an acid value of 98 mg KOH/g was produced.

Preparation Example 1

Preparation of Coated Pigment (PC)

Into a polyethylene jar, 25 g of MA8 (carbon black manufactured by Mitsubishi Chemical Corporation), 17.1 g of the acrylic resin solution (D-1), 108.5 g of tetradecane, and 400 g of 0.5 mm zirconia beads were put, and the contents were mixed with each other with PAINT SHAKER (manufactured by Toyo Seiki Seisaku-sho, Ltd.) for 120 minutes. The product was diluted with 32.5 g of tetradecane, and then the zirconia beads were removed to yield a pigment mixture liquid. Into a separable flask having a thermometer, a stirrer, a reflux condenser, and a nitrogen gas-introducing pipe, 229 g of the pigment mixture liquid was put, and then a material in which 0.8 g of 2,2'-azodis(2-methylbutyronitrile) had been dissolved in a polymerizable monomer composition composed of 1.5 g of methyl methacrylate and 2.7 g ethylene glycol dimethacrylate was added thereto. The product was stirred at room temperature for 30 minutes and then heated to 80° C. The reaction was continued at the same temperature for 15 hours to yield a tetradecane dispersion liquid of a coated pigment (PC), the dispersion liquid having a percentage of the solid content of approximately 16%. The coated pigment (PC) was optionally filtered or washed by, for example, centrifugal separation.

Reference Example 1

Preparation of Polar Solvent (P)

Into a 1 L polyethylene bottle, 500 g of ethylene glycol (manufactured by Wako Pure Chemical Industries, Ltd.) and 500 g of ion exchanged water were put, and the contents were mixed with each other with Paint Conditioner for 30 minutes to yield a polar solvent (P).

EXAMPLES

Method for Producing Colored Liquid

Example 1

Into a glass flask, 1 g of #2300 (carbon black manufactured by Mitsubishi Chemical Corporation) that served as a colorant and 99 g of p-xylene that served as a non-polar solvent were put, and the contents were dispersed with an ultrasonic disperser for 15 minutes, thereby yielding a colored liquid (A-1).

Example 2

In order to produce a colored liquid (A-2), 17.6 g of the tetradecane dispersion liquid of the coated pigment (PC), which served as a colorant, and 22.4 g of tetradecane that served as a nonpolar solvent were prepared and subjected to ultrasonic dispersion with an ultrasonic disperser for 2 hours.

Example 3

Into a 100 ml polyethylene bottle, 3 g of MA-8 (carbon black manufactured by Mitsubishi Chemical Corporation), 3 g of KF-859 (amino-modified silicone oil manufactured by Shin-Etsu Chemical Co., Ltd.), 24 g of KF-96-2cs (dimethyl silicone oil manufactured by Shin-Etsu Chemical Co., Ltd.), and 180 g of 0.5 mm zirconia beads were put, and the contents were dispersed with Paint Conditioner for 120 minutes, thereby producing a colored liquid (A-3).

Example 4

Into a 100 ml polyethylene bottle, 3 g of Fastgen Blue TGR (phthalocyanine pigment manufactured by DIC Corporation), 6 g of Solsperse 11200 (manufactured by The Lubrizol Corporation), 21 g of tetradecane, and 180 g of 0.5 mm zirconia beads were put, and the contents were dispersed with Paint Conditioner for 120 minutes, thereby producing a colored liquid (A-4).

Example 5

Into a 100 ml polyethylene bottle, 3 g of Cinquasia Magenta L4400 (quinacridone pigment manufactured by BASF), 6 g of Solsperse 11200 (manufactured by The Lubrizol Corporation), 21 g of tetradecane, and 180 g of 0.5 mm zirconia beads were put, and the contents were dispersed with Paint Conditioner for 120 minutes, thereby producing a colored liquid (A-5).

Example 6

Into a 100 ml polyethylene bottle, 3 g of Fast Yellow 7413 (azo pigment manufactured by SANYO COLOR WORKS, Ltd.), 6 g of Solsperse 11200 (manufactured by The Lubrizol Corporation), 21 g of tetradecane, and 180 g of 0.5 mm zirconia beads were put, and the contents were dispersed with Paint Conditioner for 120 minutes, thereby producing a colored liquid (A-6).

Example 7

Into a 100 ml polyethylene bottle, 4 g of Fastgen Blue TGR (phthalocyanine pigment manufactured by DIC Corporation), 2.4 g of the resin (D-2) used for dispersion, 4 g of diethylene glycol, 29.4 g of ion exchanged water, and 180 g of 0.5 mm zirconia beads were put, and the contents were dispersed with Paint Conditioner for 120 minutes, thereby producing a colored liquid (A-7).

Example 8

Into a 100 ml polyethylene bottle, 4 g of Cinquasia Magenta L4400 (quinacridone pigment manufactured by BASF), 2.4 g of the resin (D-2), 4 g of diethylene glycol, 29.4 g of ion exchanged water, and 180 g of 0.5 mm zirconia beads were put, and the contents were dispersed with Paint Conditioner for 120 minutes, thereby producing a colored liquid (A-8).

Examples

Method for Producing Separated Colored Liquid Composition Containing Fluorine-based Surfactant as Additive (C)

Example 9

Into a 50 mL glass bottle, 10 g of the colored liquid (A-1) and a liquid (B-1) in which 0.01 g of the fluorine-based surfactant (CF-1) produced in Synthesis Example 3 had been dissolved in 10 g of ion exchanged water were put to produce a separated colored liquid composition (J1).

Example 10

Except that a liquid (B-2) in which 0.01 g of the fluorine-based surfactant (CF-2) produced in Synthesis Example 4 had been dissolved in 10 g of ion exchanged water was used in place of the liquid (B-1), a separated colored liquid composition (J2) was produced as in Example 9.

Example 11

In a 50 mL glass bottle, 0.01 g of the fluorine-based surfactant (CF-1) produced in Synthesis Example 3 was dissolved in 10 g of the colored liquid (A-1). Then, 10 g of ion exchanged water was put as the liquid (B) into the same glass bottle to produce a separated colored liquid composition (J3).

Example 12

In a 50 mL glass bottle, 0.01 g of the fluorine-based surfactant (CF-2) produced in Synthesis Example 4 was dissolved in 10 g of the colored liquid (A-1). Then, 10 g of ion exchanged water was put as the liquid (B) into the same glass bottle to produce a separated colored liquid composition (J4).

Example 13

In a 50 mL glass bottle, 0.01 g of the fluorine-based surfactant (CF-3) produced in Synthesis Example 5 was dissolved in 10 g of the colored liquid (A-1). Then, 10 g of ion exchanged water was put as the liquid (B) into the same glass bottle to produce a separated colored liquid composition (J5).

Example 14

In a 50 mL glass bottle, 0.01 g of the fluorine-based surfactant (CF-4) produced in Synthesis Example 6 was dissolved in 10 g of the colored liquid (A-1). Then, 10 g of ion exchanged water was put as the liquid (B) into the same glass bottle to produce a separated colored liquid composition (J6).

Comparative Example 1

Into a 50 mL glass bottle, 10 g of the colored liquid (A-1) and 10 g of ion exchanged water that served as the liquid (B) were put to produce a separated colored liquid composition (H1)

Table 1 shows the components of the separated colored liquid compositions J1 to J6 of Examples and the components of the separated colored liquid composition H1 of Comparative Example. In Tables, the term "E" is an abbreviation of Example, and the term "CE" is an abbreviation of Comparative Example.

TABLE 1

| Examples•Comparative Examples | | E9 | E10 | E11 | E12 | E13 | E14 | CE1 |
|---|---|---|---|---|---|---|---|---|
| Sample of separated colored liquid composition | | J1 | J2 | J3 | J4 | J5 | J6 | H1 |
| Colored liquid (A) | Colored liquid | A-1 | A-1 | A-1 | A-1 | A-1 | A-1 | A-1 |
| | Additive (C) | None | None | CF-1 | CF-2 | CF-3 | CF-4 | None |
| Liquid (B) | Liquid | Ion exchanged water | Ion exchanged water | Ion exchanged water | Ion exchanged water | Ion exchanged water | Ion exchanged water | Ion exchanged water |
| | Additive (C) | CF-1 | CF-2 | None | None | None | None | None |
| Concentration of additive (C) to separated colored liquid composition | | 0.05% | 0.05% | 0.05% | 0.05% | 0.05% | 0.05% | 0% |

Examples

As shown in Tables 5 to 8, examples (BF-1) to (BF-17) of the liquid (B) which had compositions shown in Tables 2 to 4 were used to prepare separated colored liquid compositions (J7) to (J26) of Examples, and separated colored liquid compositions (H2) to (H8) of Comparative Examples were also prepared.

In particular, 10 g of the examples (BF-1) to (BF-17) of the liquid (B) and 1 g of the colored liquids (A-2) to (A-8) were put into 20 mL glass bottles to produce separated colored liquid compositions.

TABLE 2

| Examples·Comparative Examples | | E15 | E16 | E17 | E18 | E19 | E20 |
|---|---|---|---|---|---|---|---|
| Liquid (B) | Sample | BF-1 | BF-2 | BF-3 | BF-4 | BF-5 | BF-6 |
| | Solvent | DEG | DEG | DEG | DEG | DEG | DEG |
| | Additive (C) | CF-3 | CF-3 | CF-4 | CF-4 | CF-5 | CF-5 |
| | Amount of additive (C) (%) | 0.1% | 0.01% | 0.1% | 0.01% | 0.1% | 0.01% |

TABLE 3

| Examples·Comparative Examples | | E21 | E22 | E23 | E24 | E25 | E26 |
|---|---|---|---|---|---|---|---|
| Liquid (B) | Sample | BF-7 | BF-8 | BF-9 | BF-10 | BF-11 | BF-12 |
| | Solvent | DEG | DEG | DEG | DEG | DEG | DEG |
| | Additive (C) | CF-5 | CF-5 | CF-6 | CF-6 | CF-6 | CF-6 |
| | Amount of additive (C) (%) | 0.005% | 0.001% | 0.1% | 0.01% | 0.005% | 0.001% |

TABLE 4

| Examples·Comparative Examples | | E27 | E28 | E29 | E30 | E31 |
|---|---|---|---|---|---|---|
| Liquid (B) | Sample | BF-13 | BF-14 | BF-15 | BF-16 | BF-17 |
| | Solvent | DEG | DEG | P | P | Octanol |
| | Additive (C) | CF-7 | CF-7 | CF-5 | CF-6 | CF-3 |
| | Amount of additive (C) (%) | 0.1% | 0.01% | 0.1% | 0.1% | 0.2% |

TABLE 5

| Examples·Comparative Examples | CE2 | E32 | E33 | E34 | E35 | E36 | E37 |
|---|---|---|---|---|---|---|---|
| Sample of separated colored liquid composition | H2 | J7 | J8 | J9 | J10 | J11 | J12 |
| Colored liquid (A) | A-2 | A-2 | A-2 | A-2 | A-2 | A-2 | A-2 |
| Liquid (B) | DEG | BF-1 | BF-2 | BF-3 | BF-4 | BF-5 | BF-6 |
| Concentration of additive (C) to separated colored liquid composition | 0% | 0.09% | 0.009% | 0.09% | 0.009% | 0.09% | 0.009% |

TABLE 6

| Examples·Comparative Examples | E38 | E39 | E40 | E41 | E42 | E43 | E44 |
|---|---|---|---|---|---|---|---|
| Sample of separated colored liquid composition | J13 | J14 | J15 | J16 | J17 | J18 | J19 |
| Colored liquid (A) | A-2 | A-2 | A-2 | A-2 | A-2 | A-2 | A-2 |
| Liquid (B) | BF-7 | BF-8 | BF-9 | BF-10 | BF-11 | BF-12 | BF-13 |
| Concentration of additive (C) to separated colored liquid composition | 0.0045% | 0.0009% | 0.09% | 0.009% | 0.0045% | 0.0009% | 0.09% |

TABLE 7

| Examples·Comparative Examples | CE3 | E45 | E46 | CE4 | E47 | CE5 | E48 |
|---|---|---|---|---|---|---|---|
| Sample of separated colored liquid composition | H3 | J20 | J21 | H4 | J22 | H5 | J23 |
| Colored liquid (A) | A-3 | A-3 | A-3 | A-4 | A-4 | A-5 | A-5 |

TABLE 7-continued

| Examples•Comparative Examples | CE3 | E45 | E46 | CE4 | E47 | CE5 | E48 |
|---|---|---|---|---|---|---|---|
| Liquid (B) | P | BF-15 | BF-16 | P | BF-11 | P | BF-11 |
| Concentration of additive (C) to separated colored liquid composition | 0% | 0.09% | 0.09% | 0% | 0.0045% | 0% | 0.0045% |

TABLE 8

| Examples•Comparative Examples | CE6 | E49 | CE7 | E50 | CE8 | E51 |
|---|---|---|---|---|---|---|
| Sample of separated colored liquid composition | H6 | J24 | H7 | J25 | H8 | J26 |
| Colored liquid (A) | A-6 | A-6 | A-7 | A-7 | A-8 | A-8 |
| Liquid (B) | P | BF-11 | Octanol | BF-17 | Octanol | BF-17 |
| Concentration of additive (C) to separated colored liquid composition | 0% | 0.0045% | 0% | 0.18% | 0% | 0.18% |

Examples

Method for Producing Separated Colored Liquid Composition Containing Silicone-based Surfactant as Additive (C)

Into 20 mL glass bottles, 1 g of the colored liquids (A), 10 g of the liquids (B), and the additives (C) were put to produce separated colored liquid compositions (J27) to (J56) and separated colored liquid compositions (H9) to (H16) of Comparative Examples. The amounts of the additives (C) were as shown in Tables 9 to 14.

TABLE 9

| Examples•Comparative Examples | CE9 | E52 | E53 | E54 | E55 | E56 | E57 |
|---|---|---|---|---|---|---|---|
| Sample of separated colored liquid composition | H9 | J27 | J28 | J29 | J30 | J31 | J32 |
| Colored liquid (A) | A-2 | A-2 | A-2 | A-2 | A-2 | A-2 | A-2 |
| Liquid (B) | P | P | P | P | P | P | P |
| Additive (C) | None | CS-1 | CS-1 | CS-2 | CS-2 | CS-2 | CS-3 |
| Amount of additive (C) (%) | 0% | 0.2% | 1% | 0.01% | 0.1% | 1% | 0.01% |

TABLE 10

| Examples•Comparative Examples | E58 | E59 | E60 | E61 | E62 | E63 | E64 |
|---|---|---|---|---|---|---|---|
| Sample of separated colored liquid composition | J33 | J34 | J35 | J36 | J37 | J38 | J39 |
| Colored liquid (A) | A-2 | A-2 | A-2 | A-2 | A-2 | A-2 | A-2 |
| Liquid (B) | P | P | P | P | P | P | P |
| Additive (C) | CS-3 | CS-3 | CS-3 | CS-4 | CS-4 | CS-4 | CS-4 |
| Amount of additive (C) (%) | 0.05% | 0.1% | 1% | 0.005% | 0.01% | 0.1% | 1% |

TABLE 11

| Examples•Comparative Examples | E65 | E66 | E67 | E68 | E69 | E70 | E71 |
|---|---|---|---|---|---|---|---|
| Sample of separated colored liquid composition | J40 | J41 | J42 | J43 | J44 | J45 | J46 |
| Colored liquid (A) | A-2 | A-2 | A-2 | A-2 | A-2 | A-2 | A-2 |
| Liquid (B) | P | P | P | P | P | P | P |
| Additive (C) | CS-5 | CS-5 | CS-5 | CS-5 | CS-6 | CS-6 | CS-7 |
| Amount of additive (C) (%) | 0.005% | 0.01% | 0.1% | 1% | 0.05% | 1% | 0.2% |

TABLE 12

| Examples•Comparative Examples | E72 | CE10 | E73 | E74 | CE11 | E75 | E76 |
|---|---|---|---|---|---|---|---|
| Sample of separated colored liquid composition | J47 | H10 | J48 | J49 | H11 | J50 | J51 |
| Colored liquid (A) | A-2 | A-2 | A-2 | A-2 | A-3 | A-3 | A-3 |
| Liquid (B) | P | DEG | DEG | DEG | P | P | P |
| Additive (C) | CS-7 | None | CS-4 | CS-5 | None | CS-4 | CS-5 |
| Amount of additive (C) (%) | 1% | 0% | 0.2% | 0.2% | 0% | 0.1% | 0.1% |

TABLE 13

| Examples•Comparative Examples | CE12 | E77 | CE13 | E78 | CE14 | E79 | CE15 |
|---|---|---|---|---|---|---|---|
| Sample of separated colored liquid composition | H12 | J52 | H13 | J53 | H14 | J54 | H15 |
| Colored liquid (A) | A-4 | A-4 | A-5 | A-5 | A-6 | A-6 | A-7 |
| Liquid (B) | P | P | P | P | P | P | Octanol |
| Additive (C) | None | CS-5 | None | CS-5 | None | CS-5 | None |
| Amount of additive (C) (%) | 0% | 0.1% | 0% | 0.1% | 0% | 0.1% | 0% |

TABLE 14

| | Examples•Comparative Examples | | |
|---|---|---|---|
| | E80 | CE16 | E81 |
| Sample of separated colored liquid composition | J55 | H16 | J56 |
| Colored liquid (A) | A-7 | A-8 | A-8 |
| Liquid (B) | Octanol | Octanol | Octanol |
| Additive (C) | CS-3 | None | CS-3 |
| Amount of additive (C) (%) | 0.2% | 0% | 0.2% |

In Tables 1 to 14, the abbreviations are as follows (except the name of samples).

DEG: diethylene glycol (manufactured by Wako Pure Chemical Industries, Ltd.)

Octanol: 1-octanol (manufactured by Wako Pure Chemical Industries, Ltd.)

(Evaluation of Effect of Adding Additive (C): Light Transmittance)

Glass bottles holding the separated colored liquid compositions of Examples and Comparative Examples were shaken for 30 seconds and then left to stand for 24 hours. Then, the light transmittance of the liquids (B) was measured to evaluate the degree of the intrusion of the colorants into the liquids (B). The measurement of light transmittance was carried out under the following conditions.

Measurement Equipment: Spectrophotometer U-4100 manufactured by Hitachi High-Technologies Corporation Measured wavelength range: 400 to 700 nm Cell length: 1 cm Slit width: 2.00 nm Sampling interval: 1.00 nm Scan speed: 300 nm/min In this case, the average transmittance of light within the measured wavelength range was defined as the light transmittance of the layer of a polar liquid. In the case where transmittance was higher in a sample than in a case in which the additive (C) had not been added, the sample was evaluated as being good (YES); otherwise, the sample was evaluated as being defective (NO).

(Evaluation of Effect of Adding Additive (C): Status of Interface)

Glass bottles holding the separated colored liquid compositions of Examples and Comparative Examples were shaken for 30 seconds and then left to stand for 24 hours. Then, the statuses of the interfaces between the colored liquids (A) and the liquids (B) were visually observed. A clear interface was evaluated as being good (YES), and an interface at which aggregates had been generated and an interface at which a mixed layer of the colored liquid (A) and the liquid (B) had been formed with the result that the interface was not able to be clearly observed were evaluated as being defective (NO).

(Evaluation of Effect of Adding Additive (C): Dirt on Glass Wall)

Glass containers holding the separated colored liquid compositions of Examples and Comparative Examples were shaken for 30 seconds and then left to stand for 24 hours. Then, the statuses of the glass walls were visually observed. Results of the observation were evaluated on the basis of the following three criteria.

A: No dirt on glass wall, B: Colored substance adhering to glass wall, and C: Colored glass wall

TABLE 15

| Results of transmittance | E9 | E10 | E11 | E12 | E13 | E14 | CE1 |
|---|---|---|---|---|---|---|---|
| Separated colored liquid composition | J1 | J2 | J3 | J4 | J5 | J6 | H1 |
| Transmittance (%) | 8.50% | 43.50% | 99.90% | 45.80% | 80.80% | 98.70% | 0% |
| Evaluation | YES | YES | YES | YES | YES | YES | — |
| State of interface | YES | YES | YES | YES | YES | YES | NO |

From Table 15, in Comparative Example 1, the layer of the liquid (B) had a very low light transmittance, and strong coloration by the colorant made the interface unclear, which shows that the colorant which had been dispersed in the layer of the colored liquid (A) intruded into the layer of the liquid (B) to a large extent. In contrast, in each of Examples 9 to 14, the layer of the liquid (B) had a light transmittance higher than that in Comparative Example, and the interface was clear, which clearly shows that the intrusion of the colorant into the layer of the liquid (B) was reduced as compared with Comparative Example.

TABLE 16

| Results of state of interface | CE2 | E32 | E33 | E34 | E35 | E36 | E37 |
|---|---|---|---|---|---|---|---|
| Separated colored liquid composition | H2 | J7 | J8 | J9 | J10 | J11 | J12 |
| Transmittance (%) | 37.8% | 66.7% | 44.4% | 68.9% | 45.6% | 83.3% | 77.7% |
| Evaluation | — | YES | YES | YES | YES | YES | YES |
| State of interface | NO | YES | YES | YES | YES | YES | YES |

TABLE 17

| Results of state of interface | E38 | E39 | E40 | E41 | E42 | E43 | E44 |
|---|---|---|---|---|---|---|---|
| Separated colored liquid composition | J13 | J14 | J15 | J16 | J17 | J18 | J19 |
| Transmittance (%) | 73.3% | 72.2% | 71.1% | 66.7% | 65.6% | 61.1% | 72.4% |
| Evaluation | YES | YES | YES | YES | YES | YES | YES |
| State of interface | YES | YES | YES | YES | YES | YES | NO |

TABLE 18

| Results of state of interface | CE3 | E45 | E46 | CE4 | E47 | CE5 | E48 |
|---|---|---|---|---|---|---|---|
| Separated colored liquid composition | H3 | J20 | J21 | H4 | J22 | H5 | J23 |
| Transmittance (%) | 70.1% | 82.3% | 78.5% | 29.6% | 84.2% | 47.4% | 82.0% |
| Evaluation | — | YES | YES | — | YES | — | YES |
| State of interface | NO | YES | YES | NO | YES | NO | YES |

TABLE 19

| Results of state of interface | CE6 | E49 | CE7 | E50 | CE8 | E51 |
|---|---|---|---|---|---|---|
| Separated colored liquid composition | H6 | J24 | H7 | J25 | H8 | J26 |
| Transmittance (%) | 70.0% | 78.2% | 55.9% | 92.3% | 31.7% | 69.7% |
| Evaluation | — | YES | — | YES | — | — |
| State of interface | NO | YES | NO | YES | NO | YES |

From Tables 16 to 19, comparing Comparative Example 2 with Examples 32 to 43, Comparative Example 3 with Examples 45 and 46, Comparative Example 4 with Example 47, Comparative Example 5 with Example 48, Comparative Example 6 with Example 49, Comparative Example 7 with Example 50, and Comparative Example 8 with Example 51, the light transmittance of the liquids (B) was higher in all Examples than in Comparative Examples, and the interfaces were clear in all Examples, which clearly shows that the intrusion of the colorants into the layers of the liquids (B) was reduced as compared with Comparative Examples. In Example 44 in which the fluorine-based surfactant (CF-7) was used, although the intrusion of the colorant into the layer of the liquid (B) was reduced as compared with Comparative Example 2, a clear interface was not formed. Hence, the effect of the fluorine-based surfactant (CF-7) having a weight average molecular weight greater than 100,000 had a limit, and the weight average molecular weight of the additive (C) was therefore preferably in the range of 2,000 to 100,000.

TABLE 20

| Results of Transmittance | CE9 | E52 | E53 | E54 | E55 | E56 | E57 |
|---|---|---|---|---|---|---|---|
| Separated colored liquid composition | H9 | J27 | J28 | J29 | J30 | J31 | J32 |
| Transmittance (%) | 66.7% | 83.6% | 76.5% | 73.8% | 71.5% | 70.5% | 86.7% |
| Evaluation | — | YES | YES | YES | YES | YES | YES |
| State of interface | NO | YES | YES | YES | YES | YES | YES |
| Dirt on glass wall | C | C | C | B | B | B | B |

TABLE 21

| Results of Transmittance | E58 | E59 | E60 | E61 | E62 | E63 | E64 |
|---|---|---|---|---|---|---|---|
| Separated colored liquid composition | J33 | J34 | J35 | J36 | J37 | J38 | J39 |
| Transmittance (%) | 90.0% | 90.5% | 90.6% | 85.4% | 90.2% | 90.8% | 90.4% |
| Evaluation | YES | YES | YES | YES | YES | YES | YES |
| State of interface | YES | YES | YES | NO | YES | YES | YES |
| Dirt on glass wall | B | A | A | C | B | A | A |

TABLE 22

| Results of Transmittance | E65 | E66 | E67 | E68 | E69 | E70 | E71 |
|---|---|---|---|---|---|---|---|
| Separated colored liquid composition | J40 | J41 | J42 | J43 | J44 | J45 | J46 |
| Transmittance (%) | 89.9% | 90.7% | 90.8% | 90.7% | 83.3% | 82.5% | 68.7% |
| Evaluation | YES | YES | YES | YES | YES | YES | YES |
| State of interface | NO | YES | YES | YES | YES | YES | NO |
| Dirt on glass wall | C | B | A | A | B | A | C |

TABLE 23

| Results of Transmittance | E72 | CE10 | E73 | E74 | CE11 | E75 | E76 |
|---|---|---|---|---|---|---|---|
| Separated colored liquid composition | J47 | H10 | J48 | J49 | H11 | J50 | J51 |
| Transmittance (%) | 69.0% | 37.8% | 62.3% | 63.8% | 67.9% | 83.2% | 85.4% |
| Evaluation | YES | — | YES | YES | — | YES | YES |
| State of interface | NO | NO | YES | YES | NO | YES | YES |
| Dirt on glass wall | C | C | A | A | B | B | B |

TABLE 24

| Results of Transmittance | CE12 | E77 | CE13 | E78 | CE14 | E79 | CE15 |
|---|---|---|---|---|---|---|---|
| Separated colored liquid composition | H12 | J52 | H13 | J53 | H14 | J54 | H15 |
| Transmittance (%) | 29.6% | 63.9% | 47.4% | 79.7% | 70.0 | 85.3% | 55.9 |
| Evaluation | — | YES | — | YES | — | YES | — |
| State of interface | NO | YES | NO | YES | NO | YES | NO |
| Dirt on glass wall | C | B | C | B | C | B | C |

TABLE 25

| Results of Transmittance | E80 | CE16 | E81 |
|---|---|---|---|
| Separated colored liquid composition | J55 | H16 | J56 |
| Transmittance (%) | 91.7% | 31.7% | 73.6% |
| Evaluation | YES | — | YES |
| State of interface | YES | NO | YES |
| Dirt on glass wall | B | C | B |

From Tables 20 to 25, comparing Comparative Example 9 with Examples 52 to 60, 62 to 64, and 66 to 70; Comparative Example 10 with Examples 73 and 74; Comparative Example 11 with Examples 75 and 76; Comparative Example 12 with Example 78; Comparative Example 13 with Examples 78; Comparative Example 14 with Examples 79; Comparative Example 15 with Example 80; and Comparative Example 16 with Example 81, the light transmittance of the liquids (B) was higher in all Examples than in all Comparative Examples, and the interfaces were clear in all Examples, which clearly shows that the intrusion of the colorants into the layers of the liquids (B) was reduced as compared with Comparative Example.

In each of Examples 61 and 62 in which the amount of the additive (C) was less than 0.01%, the intrusion of the colorant into the layer of the liquid (B) was reduced as compared with Comparative Example 9, which shows that a good effect was provided. In contrast, the status of the interface was evaluated as "NO". From this standpoint, the amount of the additive (C) was more preferably not less than 0.01%.

In each of Examples 71 and 72 in which the HLB of the additive (C) was less than four, the intrusion of the colorant into the layer of the liquid (B) was reduced as compared with Comparative Example 9, which shows that a good effect was provided. In contrast, the status of the interface was evaluated as "NO". From this standpoint, the HLB of the additive (C) was more preferably not less than four.

The present invention enables a colorant contained in a colored liquid to be prevented from intruding into a liquid immiscible with the colored liquid across the interface therebetween and/or enables formation of the clear interface between the layers of the two liquids which contact each other as described above; thus, the separated colored liquid composition which enables optical modulation by a droplet of the colored liquid to be stably maintained in electrowetting displays can be provided.

The invention claimed is:

1. A separated colored liquid composition capable of an optical modulation, the separated colored liquid composition comprising:

a colored liquid (A), a liquid (B) immiscible with the colored liquid, and an additive (C), wherein the additive (C) is at least one additive (C) selected from the group consisting of a fluorine-based surfactant and a silicone-based surfactant, the silicone-based surfactant is alkylene oxide-modified polyorganosiloxane with HLB (hydrophilic-lipophilic balance) of not less than four, the fluorine-based surfactant is a polymer or copolymer produced through polymerization or copolymerization of a monomer (X) which is an essential monomer and which has at least one functional group selected from the group consisting of a fluorinated alkyl group, a fluorinated alkylene group, a fluorinated alkyl ether group, and a fluorinated alkylene ether group and a polymerizable group at one or two ends of the structure, and wherein the separated colored liquid composition for forming an image in a device involving an optical modulation by an electrowetting technique or an electrofluidic technique such that a color or brightness of the composition can be changed by applying an external electric field thereto, thereby moving or subjecting the colored liquid to a change in shape.

2. The separated colored liquid composition according to claim 1, wherein the fluorine-based surfactant is a copolymer produced through copolymerization of a monomer (X) having at least one functional group selected from the group consisting of a fluorinated alkyl group, a fluorinated alkylene group, a fluorinated alkyl ether group, and a fluorinated alkylene ether group and a polymerizable group at one or two ends of the structure with at least one monomer (Y) selected from the group consisting of a monomer having an alkyl group, a monomer having an aromatic group, a monomer having a polyoxyalkylene group, a monomer having a polyorganosiloxane group, (meth)acrylamide, and vinylpyridine.

3. The separated colored liquid composition according to claim 1, wherein the colored liquid (A) contains a nonpolar solvent and a colorant, and the liquid (B) contains a polar solvent.

4. The separated colored liquid composition according to claim 3, wherein the colorant is a pigment.

5. The separated colored liquid composition according to claim 1, wherein the colored liquid (A) contains a polar solvent and a colorant, and the liquid (B) contains a nonpolar solvent.

6. A colored liquid comprising the separated colored liquid composition according to claim 1.

7. The colored liquid according to claim 6 further comprising a nonpolar solvent.

8. The colored liquid according to claim 6 further comprising a polar solvent.

* * * * *